United States Patent
Lambert et al.

[11] Patent Number: 6,038,601
[45] Date of Patent: Mar. 14, 2000

[54] METHOD AND APPARATUS FOR STORING AND DELIVERING DOCUMENTS ON THE INTERNET

[75] Inventors: Mark L. Lambert, Atherton; Daniel J. G. van der Rijn, San Carlos; David J. Kemper, San Mateo; Jay L. Verkler, Menlo Park, all of Calif.

[73] Assignee: Tibco, Inc., Palo Alto, Calif.

[21] Appl. No.: 08/897,786

[22] Filed: Jul. 21, 1997

[51] Int. Cl.⁷ .................................................. H04J 3/17
[52] U.S. Cl. ........................... 709/226; 370/468; 709/240
[58] Field of Search ..................... 395/200.33, 200.43, 395/200.46–200.49, 200.54, 200.56, 200.57; 370/234, 468, 444, 462; 709/232, 226, 224, 240

[56] References Cited

U.S. PATENT DOCUMENTS

| | | | |
|---|---|---|---|
| 3,848,193 | 11/1974 | Martin et al. | 325/53 |
| 4,287,592 | 9/1981 | Paulish et al. | 370/88 |
| 4,429,385 | 1/1984 | Cichelli et al. | 370/92 |
| 4,815,030 | 3/1989 | Cross et al. | 364/900 |
| 4,868,866 | 9/1989 | Williams, Jr. | 380/49 |
| 4,974,149 | 11/1990 | Valenti | 364/200 |
| 5,105,184 | 4/1992 | Pirani et al. | 340/721 |
| 5,220,657 | 6/1993 | Bly et al. | 395/425 |
| 5,230,048 | 7/1993 | Moy | 395/600 |
| 5,339,239 | 8/1994 | Manabe et al. | 364/401 |
| 5,347,632 | 9/1994 | Filepp et al. | 395/200 |
| 5,515,098 | 5/1996 | Carles | 348/8 |
| 5,557,608 | 9/1996 | Calvignac et al. | 370/462 X |
| 5,577,266 | 11/1996 | Takahisa et al. | 455/66 |
| 5,579,537 | 11/1996 | Takahisa | 455/66 |
| 5,617,565 | 4/1997 | Augenbraun et al. | 395/604 |
| 5,675,510 | 10/1997 | Coffey et al. | 395/200.54 |
| 5,687,167 | 11/1997 | Bertin et al. | 370/444 X |
| 5,734,909 | 3/1998 | Bennett | 395/200.59 |
| 5,742,772 | 4/1998 | Sreenan | 395/200.56 |
| 5,751,956 | 5/1998 | Kirsch | 395/200.33 |
| 5,754,774 | 5/1998 | Bittinger et al. | 395/200.33 |
| 5,764,908 | 6/1998 | Shoji et al. | 395/200.47 |
| 5,799,002 | 8/1998 | Krishman | 370/234 |

FOREIGN PATENT DOCUMENTS 9309631  11/1991  WIPO .

OTHER PUBLICATIONS

Ari Luotonen et al., World Wide Proxies, http://www.w3.org/archives/,pp. 1–8, Apr. 1994.

Ari Luotonen et al., Logging Control in W3C httpd, http://www.w3.org/archives/, pp. 1–4, Jul. 1995.

Ari Luotonen et al., Caching Algorithm of CERN httpd, http://www.w3.org/archives/, pp. 1–4, Dec. 1994.

(List continued on next page.)

*Primary Examiner*—Zarni Maung
*Assistant Examiner*—Patrice L. Winder
*Attorney, Agent, or Firm*—Blakley, Sokoloff, Taylor & Zafman LLP

[57] ABSTRACT

An improved method and apparatus is used for storing and delivering information over the Internet and using Internet technologies. According to one embodiment of the present invention, a method and apparatus for maintaining statistics on a server is disclosed. According to an alternative embodiment, a method and apparatus is disclosed for predicting data that a client device may request from a server on a network. In another embodiment of the present invention, a method and apparatus is disclosed for managing bandwidth between a client device and a network. According to yet another embodiment, a method and apparatus is disclosed for validating a collection of data. According to yet another embodiment, a method for providing notification to clients from servers is disclosed.

5 Claims, 10 Drawing Sheets

OTHER PUBLICATIONS

Duane Wessels, Intelligent Caching for World Wide Web Objects, http://www/isoc.org/, pp. 1–15, May 1995.

Evangelos P. Markatos et al., A Top–10 Approach to Prefetching on the Web, http://www.ics.forth.gr/proj/, pp. 1–15, Aug. 1996.

Pillip M. Hallam–Baker, Notification for Proxy Caches, http://www.w3.org/pub/, pp. 1–5, Feb. 1996.

Chris Dodge et al., Web cataloguing through cache exploitation and steps toward consistency maintenance, Computer Networks and ISDN Systems, pp. 1003–1008, Dec. 1995.

Thomas T. Kwan et al., NCSA's World Wide Web Server: Design and Performance, IEEE, pp. 68–74, Dec. 1995.

"A Structure For Transportable, Dynamic Multimedia Documents", Dick C.A. Bulterman, Proceedings of the Summer 1991 USENIX Conference Jun. 10–14, 1991, pp. iii–vi and 137–155, Nashville, TN.

"An Interchange Standard And System For Browsing Digital Documents", Andrew Jonathan Kass, pp. Cover page, Abstract page & pp. 5–105, Massachusetts Institute of Technology, 1995.

"Pointcast To Team With Microsoft, Add New Net Dimension", George Avalos, Contra Costa Times, 2 pp.., Dec. 12, 1996.

"Microsoft Picks On–Line News From PointCast", David Bank, 1 pg., The Wall Street Journal Marketplace, Dec. 12, 1996.

"Microsoft To Expand Its Internet Reach", 1 pg., Los Angeles Times, Dec. 12, 1996.

The ISI Experimental Multimedia Mail System, Jonathan B. Postel, et al., ISI Research Report, Sep. 1986, pp. 1–27.

"An Interpersonal Multimedia Visualization System", Richard L. Philips, Los Alamos National Laboratory, IEEE Computer Graphics & Applications, pp. 20–27, May 1991.

"Architectures For Personalized Multimedia", Srinivas Ramanathan, et al., University of California at San Diego, Spring, 1994 IEEE pp. 37–46.

"Pushing the Envelope on delivery of Customized Internet", New York Times, 2 pp., Laurence Zuckerman, Dec. 9, 1996.

"SIFT A Tool For Wide–Area Information Dissemination, "Tak W. Yan, et al., pp. 177–186, 1995 USENIX Technical Conference, Jan. 16–20, 1995.

"The RightPages Image–Based Electronic Library For Alerting And Browsing", pp. 17–26, Guy A. Story, et al., AT&T Bell Laboratories, Sep. 1992.

"Two Free Programs Deliver News To Your PC", 1 pg., Gabrielle Mitchell, PC World Aug. 1996.

"A Need–To–Know Basis", 1 pg., WebMaster, Oct. 1996.

"Microsoft Cuts Deals With 2 Firms", San Jose Mercury News, 1 pg., Dec. 12, 1996.

"Microsoft Unites With PointCast at Trade Show", The San Francisco Chronicle, Jean Sheartz, 1 pg., Dec. 12, 1996.

"Microsoft And PointCast In Broadcast Alliance", The New York Times, Laurence Zuckerman, 1 pg., Dec. 12, 1996.

"Big Business at Businesswire.Com", Christopher Elliott, Web Techniques, Dec. 1996, pp. 95–99.

"Microsoft Teams With PointCast", The Globe And Mail, Patrick Bretmour, 1 pg., Dec. 12, 1996.

"Journalist™ , Your Personalized Newspaper for CompuServe", PED Software Corporation, pp. 1–143.

"Synchronization of Multimedia Data For A Multimedia News–On–Demand Application", Louise Lamont, et al., IEEE Journal on Selected areas in Communications, pp. 164–278, vol. 14, No. 1, Jan. 1996.

"Tele–Briefs A Novel User–Selectable Real Time News Headline Service For Cable TV", Ralph H. Baer, 3 pp., IEEE Transactions on Consumer Electronics, vol. CE–25, No. 3, Jul. 1979.

"News To The Desktop", Interactive Age, John Evan Frook, 3 pp., Apr. 29, 1996.

"The Digital News System At EDUCOM: A Convergence of Interactive Computing, Newspapers, Television and High––Speed Networks", pp. 113–116, Eric M. Hoffert, et al., Apr. 1991, vol. 34, No. 4.

"PointCast Network", 1 pg., Netguide, Sep. 1996.

"An Interchange Standard And System For Browsing Digital Documents", Andrew Jonathan Kass, Massachusetts Institute Of Technology, pp. 1–105, May 1995.

"Journalist Quick Start", PED Software Corp., 2 pp.

"News–on–demand For Multimedia Networks", Miller, et al., pp. 383–392, ACM Multimedia, 1993.

"News Servers, A New Generation Of NNTP Servers Provides A Vehicle for Enhanced Collaboration", Amarendra Singh, PC Magazine, pp. 183–184 & 189–190, Jan. 21, 1997.

"Push Products Redefine Internet", Jesse Berst, PC Week, 2 pp. Nov. 25, 1996.

"MediaView A General Multimedia Digital Publication System", Richard L. Phillips, pp. 3 & 75–83, Communications of The ACM, Jul. 1991, vol. 34, No. 7.

"Initial Experience With Multimedia Documents In Diamond", Forsdick, et al., pp. 99–113, May 1–4, 1984.

Proceedings of The Fifteenth International Conference On Very Large Data Bases, Peter M.G. Apers, et al., Aug. 22–25, 1989.

"Oracle—An Information Broadcasting Service Using Data Transmission In The Vertical Interval", G. A. McKenzie, Journal of the SMPTE, pp. 6–10 Jan. 1974.

"Experience With Grapevine: The Growth Of A Distributed System", Schroeder, et al., pp. 3–23, ACM Transactions on Computer Systems, vol. 2, No. 1, Feb. 1984.

"For A Window On A New World of News", Prodigy Interactive Personal Service, Copyright 1994.

Journalist™, "Your Personalized Newspaper For The Prodigy$^R$ Service", PED Software Corporation, 1993, pp. 1–141.

Patent Abstracts of Japan, European Patent Office , "Database Retrieval Communication System", Abstract date May 9, 1991, Application JP3204259.

"An Adaptation Method for SDI", Nauchno–Tekh, article , Nauchno–Teknicheskaya Informatsiya Seriya 2, 1973, USSR, 1 page.

Simba Information, Inc., "PED Delivers Personalized Newspapers To Users Desktops", Electronic Information Report, Apr. 15, 1994, vol. 15, No. 14.

Journal Article, "Innovation That Has a Purpose Is Called Key to Technology Success" Anonymous, Marketing News vol. 22, No. 6, Mar. 14, 1988, pp. 37, 40.

Quain, J., "Journalist Delivers Your Own Personalized Newspaper", PC Magazine, vol. 12, No. 17, p. 29.

Flynn, M. et al., "The Daily Me: Laying Out Tomorrow's (electronic) News", PC Magazine, vol. 12, No. 15, p. 29.

UK: Home Computer "From Your Own Correspondent", 1 pg., Independent (IND), Sep. 24, 1993.

Journalist—"A New Prodigy Add–On", PED Software, 1 pg., 1994.

New Custom File Capability For Nexis, 1 pg., May 1, 1995.

Ad on CompuServe pp. 1–2.

Prodigy article, Prodigy Services Company 1989, pp. 1–6.

METHOD AND APPARATUS FOR STORING AND DELIVERING DOCUMENTS ON THE INTERNET

FIELD OF THE INVENTION

The present invention relates to the field of Internet and wide-area networking technology. Specifically, the present invention relates to the storage and delivery of information over the Internet and using Internet technologies.

DESCRIPTION OF RELATED ART

The World Wide Web (the Web) represents all of the computers on the Internet that offer users access to information on the Internet via interactive documents or Web pages. Web information resides on Web servers on the Internet or within company networks. Web client machines running Web browsers or other internet software can access these Web pages via a communications protocol known as HyperText transport protocol (HTTP). With the proliferation of information on the Web and information accessible in company networks, it has become increasingly difficult for users to locate and effectively use this information. As such, the mode of storing, delivering, and interacting with data on the Internet, and the Web in particular, has changed over time.

FIG. 1A illustrates a typical Internet configuration comprising client 100 and content provider 102 coupled via the Internet. The content provider may include a media company, a consumer service, a business supplier, or a corporate information source inside the company's network.

The use of information within a wide-area network such as the Internet poses problems not usually experienced in smaller, local-area networks. The latency of the Internet produces delays that become the performance bottleneck in retrieving information. Clients may be connected to the network only part of the time, but still want access to information from their local platform that was retrieved from the content provider prior to being disconnected. The granularity and independence of the objects in a wide-area network, particularly the Internet, make the task of aggregating them more difficult.

The use of client and intermediate caching of the content provider information may alleviate some of the problems of the wide-area network interactions. Certain implementations today perform this caching on behalf of the client, but sacrifice data timeliness and do not address performance problems because they must validate their caches in single operations over the network.

FIG. 1A also illustrates the typical Internet configuration of client-to-content-provider interaction. Subsequent to connecting to the Internet, client 100 will generally request objects from the content provider 102. The client must locate the information, often through manual or automatic searches, then retrieve the data through the client.

When searching for the data initially, this "pull" model provides great utility in locating information. Implicit in the model, however, is that the client machine has the responsibility for finding and downloading data as desired. The user is faced with the problem of having to scour the Web for various information sites that may be of interest to him or her. Although this model provides a user with a large degree of flexibility in terms of the type of information that he or she would like to access each time he or she connects to the Internet, there is clearly a downside to the model in that the user is forced to constantly search for information on the Internet. Given the exponential rate of growth of data on the Internet, this type of searching is becoming increasingly cumbersome.

While the pull model is effective for finding information, once a user has found an information source—a location from which subsequent information of interest to the user will be distributed—he or she must continue to check for new information periodically. In the "pull" model, the server is inherently passive and the client does all the work of initiating requests. If the server has new information of interest to the client, the server has no method of delivering either the information or a notification to the client that the information exists. The content provider cannot, in the pull model, provide an "information service" where active server information is identified, then passed to the client in terms of some kind of notification.

It is therefore an object of the present invention to provide a method to manage passive and active data throughout the network, and offer an improved method and apparatus for storing and delivering information on the Internet.

SUMMARY OF THE INVENTION

The present invention discloses an improved method and apparatus for storing and delivering information over the Internet and using Internet technologies. According to one embodiment of the present invention, a method for managing, and validating a collection of data that may be distributed in caches throughout a network is disclosed. According to an alternate embodiment, a method and apparatus for maintaining statistics on a server is disclosed. According to an alternative embodiment, a method and apparatus is disclosed for predicting data that a client device may request from a server on a network. In another embodiment of the present invention, a method and apparatus is disclosed for managing bandwidth between a client device and a network. According to yet another embodiment, a method and apparatus is disclosed for validating a collection of data. According to yet another embodiment, a method for providing notification to clients from servers is disclosed. Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention relates to a method and apparatus for storing and delivering documents on the Internet. In the following detailed description, numerous specific details are set forth in order to provide a thorough understanding of the present invention. It will be apparent to one of ordinary skill in the art however, that these specific details need not be used to practice the present invention. In other instances, well known structures, interfaces and processes have not been shown in detail in order not to unnecessarily obscure the present invention.

Figure 1A:
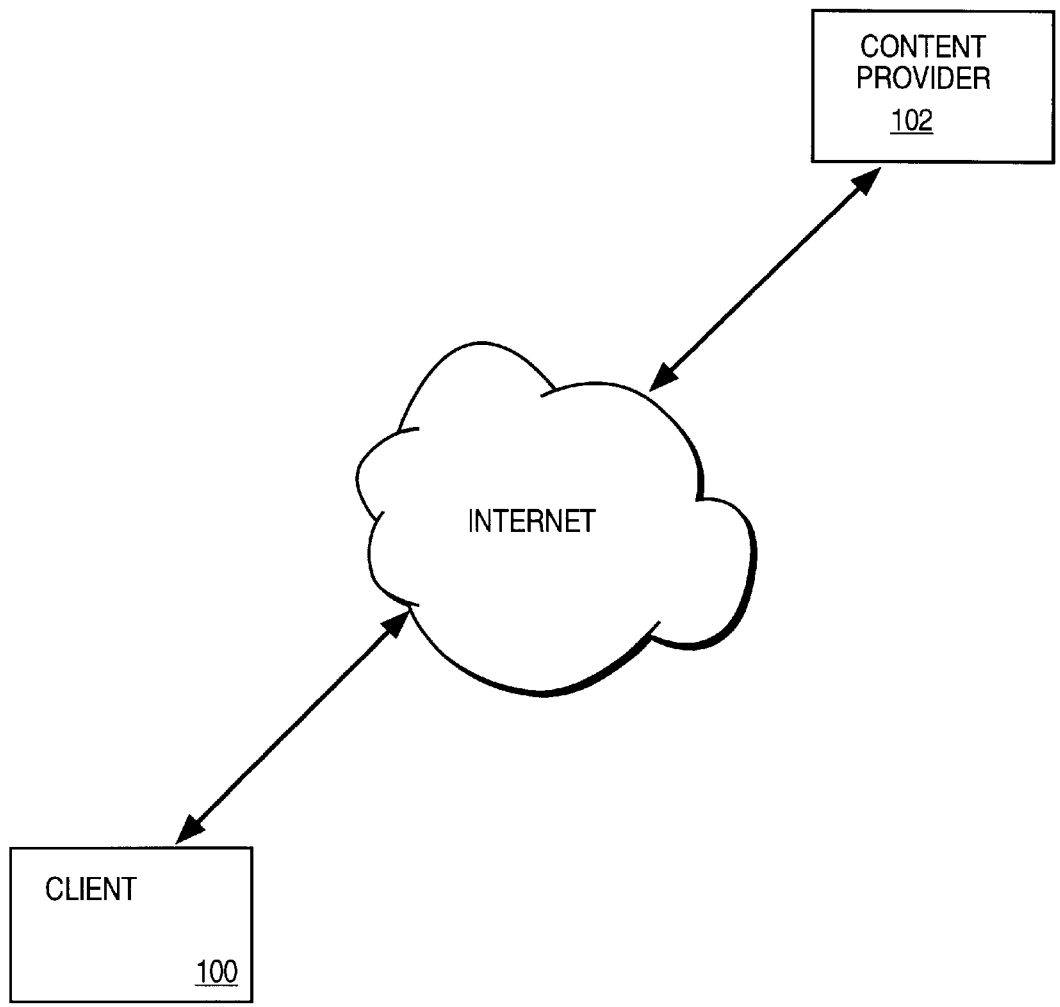
FIG. 1A illustrates a typical Internet configuration.
Figure 1B:
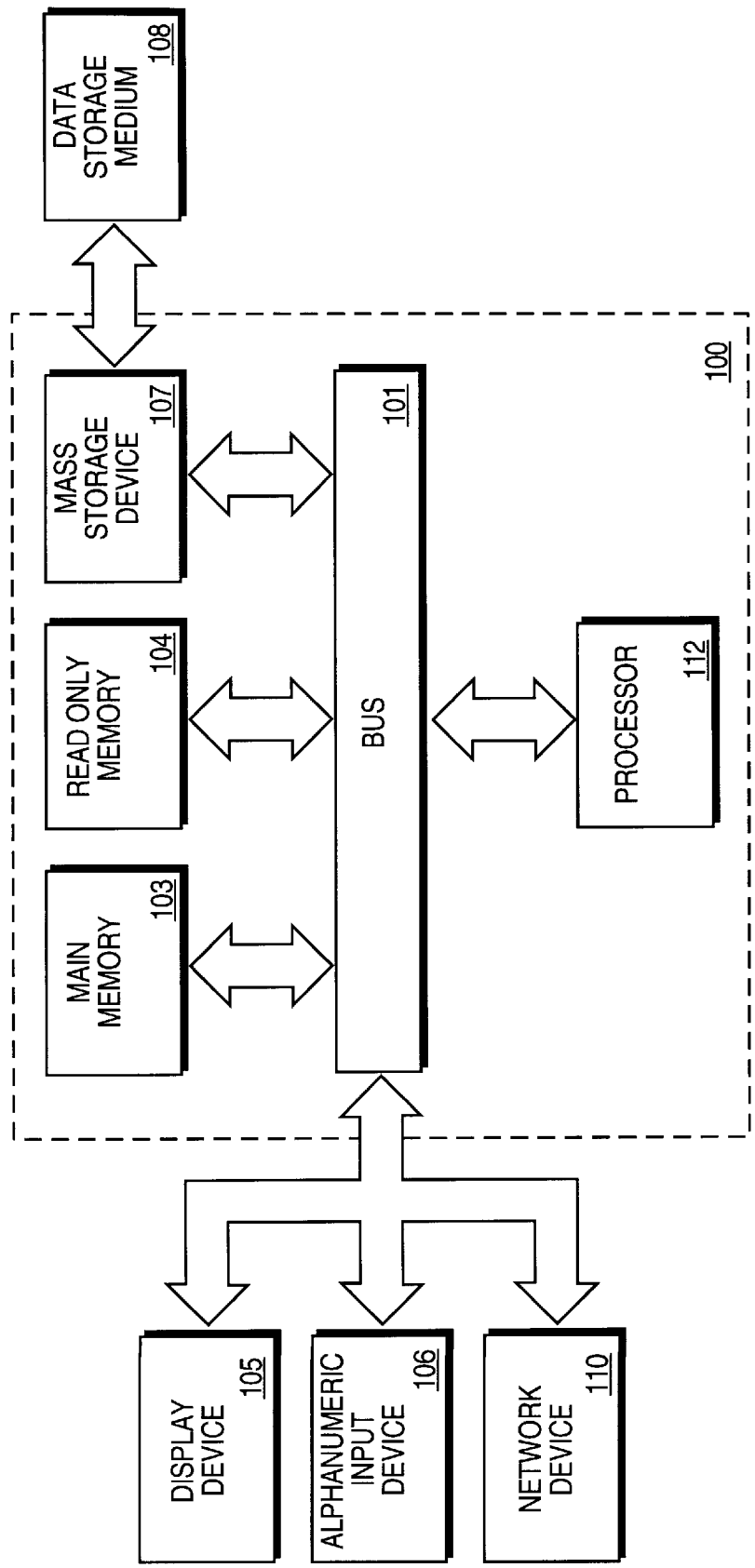
FIG. 1B illustrates a typical computer system in which the present invention operates.

FIG. 1B illustrates a typical computer system 100 in which the present invention operates. One embodiment of the present invention is implemented on a personal computer architecture. It will be apparent to those of ordinary skill in the art that other alternative computer system architectures may also be employed.

In general, such computer systems as illustrated by FIG. 1B comprise a bus 101 for communicating information, a processor 112 coupled with the bus 101 for processing information, main memory 103 coupled with the bus 101 for storing information and instructions for the processor 112, a read-only memory 104 coupled with the bus 101 for storing static information and instructions for the processor 112, a display device 105 coupled with the bus 101 for displaying information for a computer user, an input device 106 coupled with the bus 101 for communicating information and command selections to the processor 112, and a mass storage device 107 coupled with the bus 101 for storing information and instructions. A data storage medium 108, such as a magnetic disk and associated disk drive, containing digital information is configured to operate with mass storage device 107 to allow processor 112 access to the digital information on data storage medium 108 via bus 101.

Processor 112 may be any of a wide variety of general purpose processors or microprocessors such as the PENTIUM® brand processor manufactured by INTEL® Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 108 may be a hard disk, a floppy disk, a CD-ROM, a magnetic tape, or other magnetic or optical data storage medium.

In general, processor 112 retrieves processing instructions and data from a data storage medium 108 using mass storage device 107 and downloads this information into random access memory 103 for execution. Processor 112, then executes an instruction stream from random access memory 103 or read-only memory 104. Command selections and information input at input device 106 are used to direct the flow of instructions executed by processor 112. Equivalent input device 106 may also be a pointing device such as a conventional mouse or trackball device. The results of this processing execution are then displayed on display device 105.

Computer system 100 includes a network device 110 for connecting computer system 100 to a network. The network device 110 for connecting computer system 100 to the network includes Ethernet devices, data modems and ISDN adapters. It will be apparent to one of ordinary skill in the art that other network devices may also be utilized.

The preferred embodiment of the present invention is implemented as a software module, which may be executed on a computer system such as computer system 100 in a conventional manner. Using well known techniques, the application software of the preferred embodiment is stored on data storage medium 108 and subsequently loaded into and executed within computer system 100. Once initiated, the software of the preferred embodiment operates in the manner described below.

1. Introduction

The presently claimed invention improves use of the Web and wide-area networks by managing groups of network objects (content or applications) and bringing that content and notifications from servers directly to desktops in a timely fashion and while consuming a minimal amount of desktop screen space. Users subscribe to "channels", which automatically bring new content to the user's machine and render information in summary form. Detailed content attached to the subscription is rendered in the user's web browser, and automatically pre-fetched by one embodiment of the present invention.

Channel configuration and rendition, as well as related content pre-fetch are all controlled by default from the content provider via a back-end server, thus giving content providers a large amount of control over their own data and how it is presented. Content providers can supply their own graphics, advertising, ticker information, animation control, and content refresh parameters. Subscribing to channels is also simple: content providers simply place an icon on one or more pages in their site and clicking the icon causes a subscription to be created on the client side and/or the server side. The subscription is then updated automatically.

According to one embodiment, the presently claimed invention plays a unique role as an intermediary and mediator between end users, namely consumers of information, and content providers, namely producers of information. One embodiment of the present invention provides functionality that gives to the content provider control over their brand, the way in which their information is presented, and the way in which users access their web site. At the same time, users are given the ability to pick and choose the information they want from the sites they want, and presentation of that information is accelerated, thus improving the user's web experience.

An intelligent caching infrastructure that uses information (called "Meta-Data") about the content to control client and intermediate caches reduces the wide-area networking problems generally attributed to interactive content by allowing the caches to manage expiration, compaction, bulk-delivery and other operations guided via Meta-Data from the content provider. The caches become intelligent delivery nodes at the client, and within the network, because they are able to understand the important properties of the information they are managing.

The presently claimed invention also provides a notification system to the content provider and user that spans Internet, firewall, and internal network systems, and can combine various underlying transports and notifications into a general notification architecture. This offers content providers (server) the opportunity to provide pro-active information service to the user. The user may receive various types of internet and internal, company notifications and information.

When the notification and "active information" push model is combined with an intelligent caching network infrastructure, in the presently claimed invention, the user achieves the highest degree of functionality, performance, and usability. As described in further detail below, the presently claimed invention spans client and server machines, creating a system that allows feedback from the client to the back-end server, and subsequent optimization of the client by the back-end server.

2. Components

Figure 2:
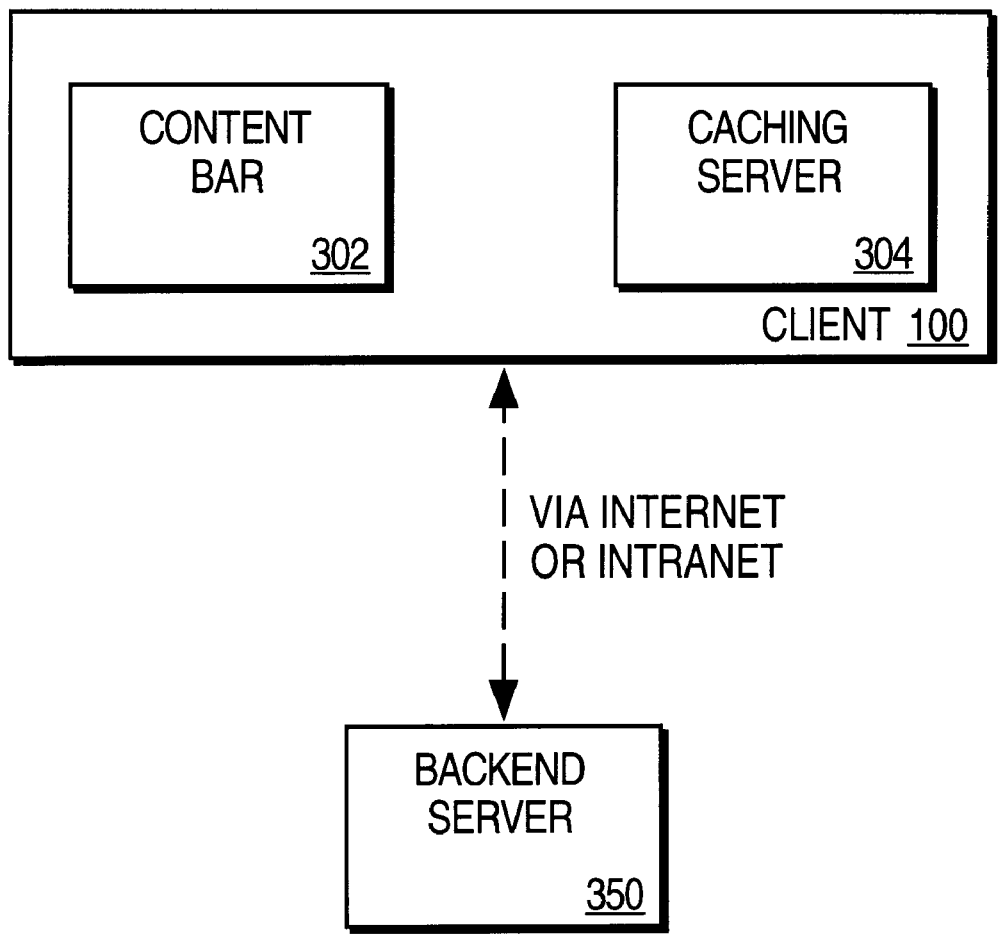
FIG. 2 illustrates the three major components according to one embodiment of the present invention.

The presently claimed invention consists of three major components: the content bar, caching server and back-end server, as illustrated in FIG. 2. The content bar 302 and the caching server 304 reside on one or more end-user computers 100 ("client machines") owned by information subscribers. The back-end server 350 resides one or more server-class computers owned by information publishers ("back-end server machines"). The content bar 302 and caching server 304 are logical components. Each component can be implemented as separate processes or within a single process.

The client machines 100 and the back-end server machines communicate over a network such as the Internet or a corporate intranet. The communication mechanism includes open standard protocols such as HTTP (Hypertext Transfer Protocol), MIME (Multipurpose Internet Mail Extensions) and TCP/IP (Transmission Control Protocol/Internet Protocol).

One embodiment of the present invention is implemented in the caching server 304. An alternate embodiment is implemented in a combination of the caching server 304 and the back-end server 350. The content bar 302 in either embodiment is a rendering environment for published content. Although the following sections describe a two-tier client-server architecture, the presently claimed invention may also be implemented according to other architectures. For example, while the content bar 302 always resides on a subscriber's client machine 100 and the back-end server 350 always resides on a publisher's back-end server machine, there can be any number of intermediate caching servers between the subscriber and the publisher.

Figure 3:
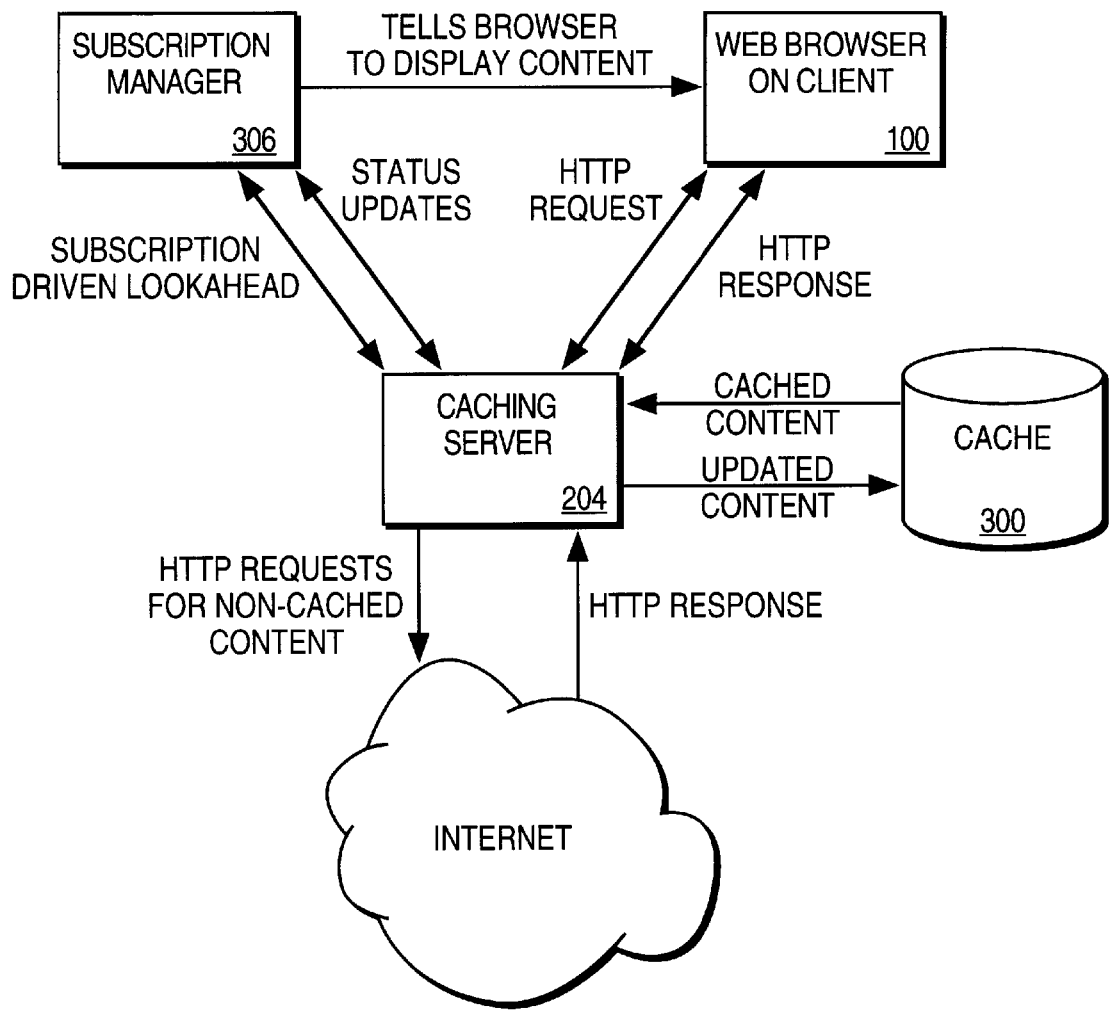
FIG. 3 illustrates an overview of how the three components of one embodiment of the present invention interact with each other.

The caching servers do not have to reside on the client machine. This configuration typically provides the best performance, however, by taking advantage of local disk access speed to increase performance. Caching servers can be deployed around the network to balance network load and provide concentration of frequently used information. In this embodiment, each caching server 304 is implemented as a standard HTTP proxy server thus allowing them to be coupled together hierarchically. FIG. 3 illustrates an overview of how the three components of one embodiment of the present invention interact with each other. A subscriber's requests to retrieve certain published content are managed by subscription manager 306 which resides on the subscriber's client machine. Subscription manager 306 communicates with Web browser 100 on the client machine to demand the requested content. Web browser 100 then sends an HTTP request to a remote caching server 204. In response, caching server 204 either retrieves cached content from cache 300 or sends an HTTP request via the Internet to a publisher's machine to retrieve non-cached content.

2.1 Content Bar

The end user interacts with the content bar. According to one embodiment, the content bar is responsible for rendering channel subscription content, configuring each subscription's look and feel, and managing the user's interaction with the web. The user can create several content bars, and can float them on the desktop, dock them to one of the edges of the display, or dock them to a web browser. When docked to one of the screen edges, the content bar can be configured to auto-hide, so that it appears only when the mouse is placed on the edge of the screen.

Each content bar contains one or more channels, namely areas of the content bar that belong to a particular content provider. Channel look and feel is under the control of the content provider via open data formats (MIME, HTTP, standard image formats such as GIF and JPEG). The content bar provides a common rendering environment for the channels so they can be moved, resized, or locally configured by the user in a standard way.

Each channel contains one or more "subscriptions." Subscriptions are agents configured to retrieve information at various times, or to process asynchronous notifications of incoming data. Initial configuration is set up by the content provider according to the content provider's publishing schedules. The user can change this information as well as add to it. Each channel subscription uses a notification mechanism to retrieve new data the notification mechanism can be simple polling, or more complex asynchronous event notification mechanisms, as described later in the document.

2.2 Caching server

The caching server manages all of the user's interaction with the web. All web requests, including those generated by the user's browser and those generated by channel subscriptions, go through the caching server. The caching server is responsible for the following areas of functionality, either alone or in concert with one or more publisher back-end servers. These areas of functionality are described in further detail later in this document:

Intelligent cache management, including local algorithms for automatic expiration management and content compaction, and algorithms shared with the back-end server for custom expiration management.

Statistics collection and upload to back-end servers

Lookahead pre-fetch of content based on local algorithms and on custom control information from back-end servers Bulk validation of content based on information (metadata) from back-end servers Intelligent bandwidth management, allowing user requests priority over background lookahead pre-fetch requests.

Registration and subscription by the user to information sources.

Handling of incoming channel subscription notifications, removing the need for the caching server to poll its content providers for new information.

A caching server can operate on its own behalf or a community of many users, who in turn have caching servers on their own machines. These higher-level caching servers can be placed at intranet/Internet boundaries to provide information concentration and conserve network bandwidth.

2.3 Back end

The back end server is a collection of software that works with client caching servers to optimize use of a publisher's site by its subscribers. According to one embodiment, each publisher has a back-end server that controls use of its content by clients and feeds information extracted from the clients back to the publisher. The back-end server is responsible for the following areas of functionality:

Maintenance of cache control meta-data. According to one embodiment, this data is provided to caching servers which use the data to control the way in which the content provider's information is cached.

Generation of subscription data and subsequent publishing of that data for retrieval by caching servers, or subsequent sending of that data directly to the caching servers.

Creation and maintenance of bulk-validation information. Bulk-validation data is initially created by the content provider and sent from the back-end server to caching servers, allowing them to validate the publisher's cached content efficiently.

Creation and maintenance of lookahead information. As above, the information is initially created by the content provider. As it is sent to caching servers and used by those servers, updated information is uploaded from the servers and used to fine-tune the lookahead information. The result is a feedback loop that tunes lookahead based on client use of the publisher's content.

Generation of content and subscription usage reports. The back-end server uses statistics uploaded from caching servers to give publishers an accurate picture of how their site is used, including for example extremely accurate advertisement display and click-through counts.

3. Shared Technology

This section details the technology that is shared by the back-end server and the caching server. According to one embodiment, the interaction between these two components provides configuration flexibility and efficient performance. By locating acceleration information at the publisher, the creation of that data is placed in the hands of the people most likely to know how to manage it, namely the publisher. By then downloading that information to caching servers, the system allows a site to be accelerated according to the wishes of the site owner, who is in the best position to know how to do this.

According to one embodiment, the system further introduces a feedback loop so that the publisher is in a position to retrieve accurate information about their site from their subscribers' caching servers. That information can be used in its own right to control advertising rates or provide reports of various sorts. The information can also be fed back into the information passing back to the caching servers, further enhancing their ability to accelerate the site.

3.1 Bulk Validation 3.1.1 Overview

Once a cached piece of content expires, the caching server must validate it. This task involves sending a request to the content's owner, and the content owner either responds that the content has not changed or provides the latest version of the content. In the latter case, the caching server still experiences the overhead of retrieving the content. In the former case, however, the server can increase performance significantly by using bulk validation. With bulk validation, a single request to the owning server results in large amounts of content being automatically validated or invalidated. Content that is invalidated is marked as expired in the cache, and the next time the caching server is asked for that content, the caching server knows to retrieve that content from the content owner. Content that is still valid has its expiration date extended and continues to be served from the cache until the content finally expires.

Bulk validation revolves around the idea that a group of content frequently has similar expiration characteristics. In a news page, for example, the masthead, footer, and side bars may be "boilerplate" that rarely changes, whereas the article and its associated images will change constantly. In a given site, all content that has similar expiration characteristics can be grouped into a single list, called a TOC (Table Of Contents). The TOC is an HTML page consisting of a header and a body that contains tags describing TOC members. The TOC is not intended to be viewed by end users; it is simply meta-data shared between the caching server and its back-end servers and used to configure the caching server's behavior. Meta-data is described in further detail in Section 3.2 Meta-Data.

Each TOC member is represented by a single ICPAGE HTML tag. The tag contains a number of attributes (TOCs are also used for lookahead configuration as described in Section 3.4.6, Custom Weight Assignment), including the LASTMOD attribute. This attribute contains the member's last-modification date in seconds since midnight Jan. 1, 1970 (standard epoch) and is stored with the member in the cache:

⟨ICPAGE

URL = "http://truth.incommon.com/library/achannels.html"

LASTMOD = 83540098⟩

Figure 4:
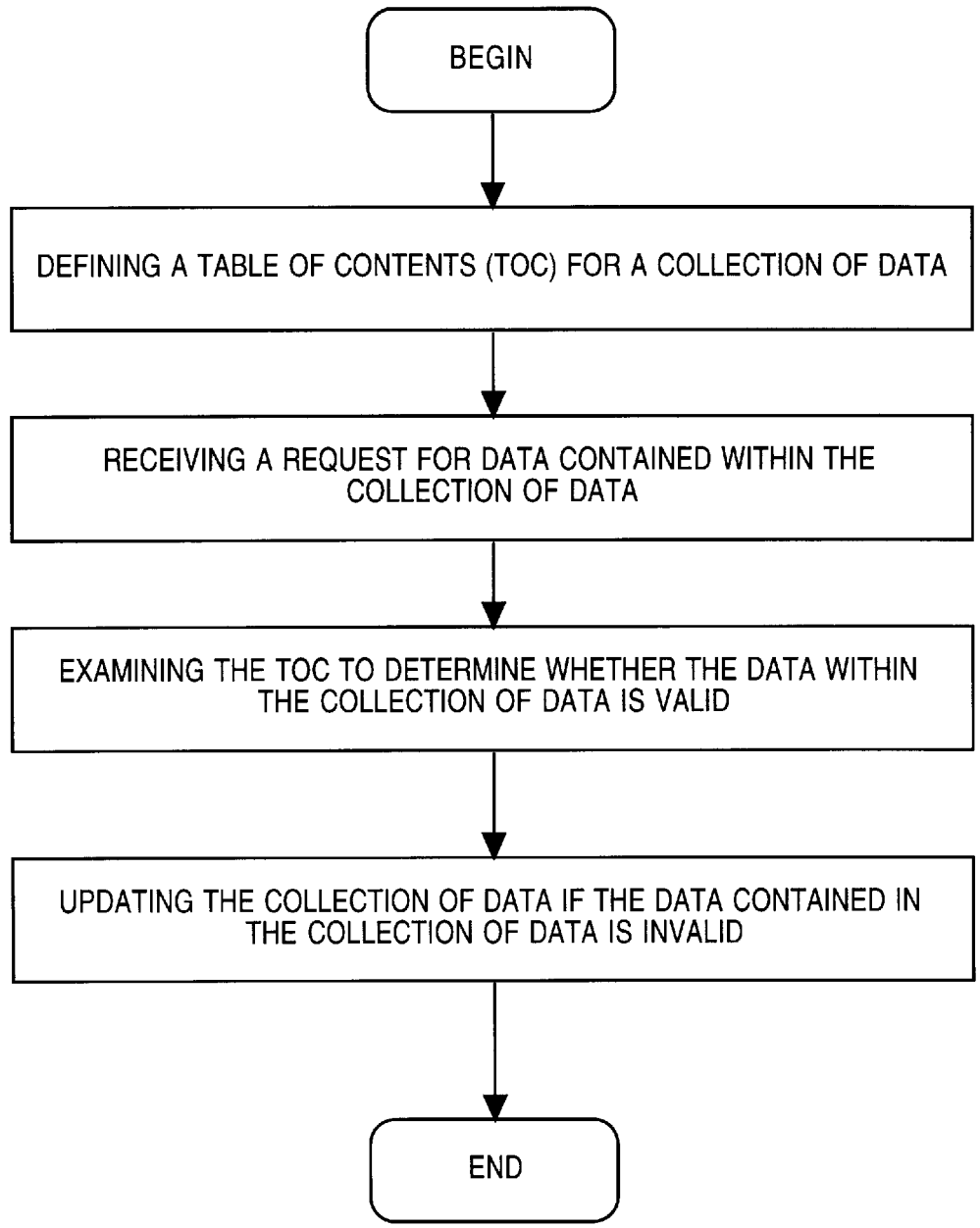
FIGS. 4–6 are flow charts illustrating embodiments of the present invention.

The TOC is assigned an expiration date, which automatically applies to all members of the TOC. The expiration date can be assigned explicitly via a standard HTML META tag (the standard mechanism for driving HTTP data from content), or via any of the custom expiration mechanisms defined in Section 3.3, Custom Expiration Control. FIG. 4 is a flow chart illustrating an overview of one embodiment of bulk validation.

3.1.2 Client Side Behavior

According to one embodiment, the caching server is designed such that whenever a TOC member is accessed, the TOC's expiration date always overrides the member's expiration date. Whenever the TOC expires, all its members automatically expire. Once a TOC expires, bulk validation begins. Any time one of its members is accessed, the member is noted as expired (it shares its TOC's expiration date), which causes the TOC to be retrieved first. The caching server receives one of two responses to its request for the TOC, just as it would for any other page. The first possibility is that the TOC has not changed. If so, then the TOC expiration date is updated according to its meta-data if present or the expiration algorithm if it is not. Each member automatically gets the new expiration date.

The second possibility is that the TOC has indeed changed, in which case the owning server sends the new TOC to the caching server. The caching server then parses the TOC's HTML stream looking for members. Each member is then looked up in the cache and its last-modification date compared with the incoming TOC copy's last-modification date for that member. If the dates are the same, the content has by definition not changed, and is assigned the TOC's new expiration date. If the dates are different, the content has changed and is automatically marked as having expired. Next time the content is accessed, it will be updated from the owning server.

This behavior results in a significant performance improvement. For example, for a TOC with 100 members (e.g. the boilerplate graphics for a web site), a single operation simultaneously validates all 100 members. Without a TOC, the caching server would have to perform 100 network operations to validate one member at a time, and most of the operations are likely to be useless because the content has probably not changed.

3.1.3 Locating TOCs

Once an administrator has generated a TOC, the local caching server must be able to find the TOC so that the TOC can be loaded. A TOC is just another form of meta-data. TOC pages are therefore located exactly the same way as site meta data is located, as described in section 3.2 Meta-Data.

3.1.4 TOC Management

According to one embodiment of the present invention, TOCs for a given site are maintained by the back-end server for that site. Each TOC has a well-known name that identifies the TOC uniquely on that site. The collection of TOCs on the site comprise a TOC catalog, that can be browsed by administrators seeking to create new TOCs, delete TOCs, or modify existing TOCs.

The TOC catalog also contains access control and authentication information. The authentication data enables the back-end server to verify the identity of administrators wishing to manage the TOCs in the catalog. The back-end server uses the access control information to restrict particular administration functions to various groups of people.

Because the back-end server handles TOC management, the actual commands to manage a TOC can be issued either from a client machine such as a client PC or from a management interface on the back-end server machine. Several client PC-based mechanisms can be used to manage TOCs. The implementor can select a client-side mechanism based on portability, UI functionality, and client environment. Following are examples of such mechanisms:

Administrator channel on the channel bar

Custom version of client with added administrator user interface functionality

HTML forms accessible from any web browser

Java apple accessible from any web browser

Microsoft Windows OCX accessible from any web browser

The client-side administration mechanisms are responsible for presenting a graphical view of the TOC catalog and its member TOCs to the administrator. In addition, the client-side/administration mechanism may provide some local editing capability as a means of increasing performance.

3.1.5 Creating a TOC

According to one embodiment, TOCs are created by the back-end server in at least one of three ways, namely by scanning file system directories recursively, by scanning the content of HTML pages for links and following those links recursively, or being supplied the TOC information directly via database or content management system through an Application Programming Interface (API). Files (in the first method) or pages (in the second method) are included in the TOC if they satisfy various criteria, including but not limited to the following:

Number of levels to search. When scanning the file system, the number of levels of folders/directories to descend before stopping. When scanning HTML content for links, the number of levels of links to follow before stopping.

A regular expression which, if matched by the file or URL, includes that file or URL in the TOC.

A regular expression which, if not matched by the file or URL, includes that file or URL in the TOC.

The TOC can be constructed using any number of different inclusion and exclusion criteria. The above list is simply a sample of the possibilities. The TOC inclusion/exclusion criteria are stored in the TOC catalog, along with other administrative information such as:

How often it is updated by the back-end server software

Any additional update-related inclusion/exclusion criteria

How it is stored in a catalog of TOCs for maintenance by administrators

Any security attributes that control site administrators' abilities to read, modify, or delete the TOC

3.1.6 Deleting a TOC

According to one embodiment, deleting a TOC consists of removing its catalog entry and associated generation criteria. The operation is performed by the back-end server, either in response to a client administration front-end or a back-end server utility. The back-end server uses its authentication and access control information to restrict TOC deletion to the appropriate administrators.

3.1.7 Modifying a TOC

According to one embodiment, modifying a TOC consists of the following operations:

Adding one or more member pages

Removing one or more member pages

Modifying a page, changing its last-modification date, version stamp, or lookahead weight.

The modifications can be performed manually by an administrator, or automatically by the back-end server according to scheduling and inclusion/exclusion criteria specified by the administrator. Manual updates are most useful in assigning custom lookahead weights to member pages. Manual updates can be performed either on the back-end server machine via server utility programs, or on a client PC via any of the graphical administration mechanisms described in section 3.1.4 TOC Management. Automatic updates are performed by the back-end server according to scheduling information stored as part of the TOC definition in the TOC catalog.

According to one embodiment, automatic updates begin with the update process saving all members of the current TOC. Any TOC members that were manually added by the administrator are specially marked. The update process then retrieves the update inclusion/exclusion criteria from the TOC definition and begins generating a new TOC based on those criteria. For each TOC member included, the update process determines whether the same member was present in the previous version of the TOC. If it was, the previous version's lookahead weight is carried over to the new version, and the previous version is marked as being present in the new version.

Once the TOC generation completes, the update process scans the previous version, copying any administrator-created pages that were not already part of the new TOC. Finally, the update process incorporates any additional lookahead weight statistics accumulated since the last TOC update, and then replaces the old version of the TOC with the new version.

3.1.8 Generalized TOC Usage

A TOC in its general form is a unit of bulk information management. It describes a set of related Web objects by URL. The system then defines operations on the set such as the bulk validation process described above. Other useful bulk operations can also be defined for TOCs. A TOC can describe a set of objects which are to be retrieved in bulk by the caching server for later off-line viewing. A TOC can also describe a set of objects to be looked ahead on, independently of the lookahead algorithm described later in this document. Sets of web objects which share caching properties can also be grouped into a TOC.

3.2 Meta-Data

3.2.1 Overview

According to one embodiment of the present invention, "meta-data" is used to configure much of the behavior of caching servers. Content providers are allowed to configure their sites independently of other sites (or individual subscriptions independently of other subscriptions, all of whom reference the same site) and that data is used to drive the behavior of the caching servers.

The term "site meta-data" is used to cover all meta-data that optimizes a particular site. The meta-data is stored in HTML tags and can therefore appear anywhere in a site. To make administration tractable, the tags are typically grouped into a single page, except for TOCs, which are pointed at from the site meta-data page.

According to one embodiment of the present invention, a site meta-data page is referenced with an ICMETA pointer tag:

```
<ICMETA URL=http://www.incommon.com/sitedefs/nytimes_
    site.html>
```

There are a number of ways that the caching server can locate meta-data pages. According to one embodiment, the site administrator can add to every page on their site an ICMETA tag identifying the meta-data page. Whenever the caching server encounters an ICMETA tag in an HTML page, it fetches the URL pointed at by the tag. This scheme has the advantage that the meta-data page gets loaded immediately whenever a page from the site is loaded.

A variation on the above scheme uses ICMETA tags on only a few "strategic" pages, for example the site's home page. Many sites place links to an index or home page on all other pages. The caching server automatically looks ahead on all pages, and if all pages have a link to a strategically-located page, the caching server quickly encounters the ICMETA tag and fetches the meta-data page.

According to an alternate embodiment, the channel developer can tag their subscription notifications with a "meta data URL" that the caching server automatically fetches before it fetches any other channel content. This last mechanism guarantees that the meta-data page will be loaded every time new channel data arrives at the caching server.

3.2.2 Areas of use

Meta-data may be used in the following areas to control caching server behavior:
 client configuration by intranet administrators
 custom expiration control
 lookahead pre-fetch configuration
 statistics upload configuration Different types of site meta-data are created differently. Because meta-data is implemented in standard HTML, simple configurations can be created directly by the content provider in a standard text or HTML editor. The data can be dispensed by the content provider's back-end server at subscription notification time, or can be loaded by the caching server whenever the caching server encounters the appropriate ICMETA tag. More complex meta-data that is derived from user feedback can initially be generated automatically and then automatically updated as user feedback is gathered. The latter mechanism is described in further detail in the following sections. Further details of other meta-data applications are also described in the following sections.

3.3 Client Configuration Meta-Data

Meta-data is used by local network administrators to configure the client software. The caching server has a built-in subscription to an HTML page containing configuration meta-data. The publisher of this subscription is the local network administrator, and the publishing host is an unqualified internet hostname. The caching server uses the host name "inCommon-Config". The client's network software will automatically qualify this host name in its local internet domain, allowing the caching server to find a server in any intranet without having to be configured at installation time. Note that a server with this name need not be dedicated for configuration; it is just as easy to give an existing host an alternate (alias) host name of "inCommon-Config".

This configuration mechanism is simple and powerful. It allows intranet administrators to configure their clients without any installation-time work by the user. Because the configuration data is received in the form of a subscription notification, clients will receive any configuration changes as soon as they are made. If multicast notification is used, only one copy of the new configuration is sent to all clients. The mechanism is reasonably secure because the configuration host name is well-known within the client's local internet domain, and the client initiates contact with the configuration publisher. Additional security can be implemented with Secure HTTP and digital signatures to authenticate the publishing host.

Notifications for the configuration subscription contain configuration directives in the form of HTML tags. The caching server interprets and then executes these directives. In this manner, the network administrator can control the caching server's caching behaviour (e.g. disabling it entirely on local area networks where the network speed is faster than the disk transfer rate), its proxy server, its default lookahead characteristics, even the set of subscriptions it currently uses. Any aspect of the caching server that the system designer deems useful to control can be controlled in this manner.

3.4 Custom Expiration Control

3.4.1 Overview

According to one embodiment, whenever the caching server is asked to retrieve content from the web, the caching server places the content in local storage while returning the content to the requestor (either the browser, a subscription, or the server itself). The server then satisfies subsequent requests for the same content from the local storage rather than going to the network. This strategy improves performance but incurs a cost, namely, if the content changes at its origin, the caching server delivers an old copy of the data from local storage, rather than the new copy from the Internet.

The caching server solves this problem by assigning each piece of content an expiration date. The server satisfies requests for cached content from local storage until the expiration date is reached, after which time it checks at the origin site to see if the content has changed. Content providers may control the expiration behavior of cached content in a number of different ways. Flexibility in this area is crucial because if a piece of content's expiration date is set incorrectly, then the user will either see old data served out of the cache, or will see lower performance as the caching server validates or retrieves content from the network unnecessarily.

According to one embodiment of the present invention, three mechanisms are used for expiration control, in addition to the standard expiration control mechanisms offered by HTTP:
 TOC-based expiration control
 ICEXPIRE meta-data expiration control
 automatic expiration control The first two types of expiration control are described in this section, because they work by sharing information between a back-end server and a caching server. Automatic expiration control is performed entirely by the caching server and is described in section 4.1 Automatic Expiration Control.

3.4.2 TOC-based Expiration Control

TOCs can be used for bulk validation and for lookahead weight configuration, as described earlier in this document. TOC-based expiration is simply a way for content providers to apply a particular expiration date to all members of a TOC without having to modify the individual members and without having to use meta-data tags.

The content provider sets the expiration date of the TOC, using any of the methods specified below, or by simply specifying an expiration in the content itself using standard HTML META tags or HTTP headers. All members of the TOC immediately get that TOC's expiration date.

TOC-based expiration gives content providers fine control over content expiration (in addition to its primary benefits of bulk validation and custom lookahead weighting). TOC-based expiration allows content providers to group URLs with many different syntaxes but similar expiration behavior into a single construct (the TOC) and expire them together, where otherwise a large number of ICEXPIRE meta-data tags would need to be used. Again, the goal is flexibility for the content provider.

3.4.3 ICEXPIRE Overview

Expiration meta-data allows content providers to use HTML to describe the expiration control behavior they desire for the caching server when serving their content. Content providers may bind regular expressions to various expiration control parameters. Any URL that matches the regular expression is automatically given an expiration date according to the parameters associated with the regular expression.

Expiration meta-data is defined and maintained by the back-end server and can be sent down to a caching server as part of a channel subscription's notification data, or loaded by the caching server as it encounters ICMETA tags in published content. The ICEXPIRE HTML tag is used to implement this functionality. The tag has four attributes, two of which control lookup behavior and the remaining of which define the expiration date.

Regular expression processing is traditionally slow. Given that caching server performance is extremely important, the ICEXPIRE tag provides a high-speed level of lookup before regular expression matching is performed. The HOST attribute defines a host name to which the expiration applies. Only those URLs with a matching host name are considered for regular expression matching. The host names can be used as keys in a hash table, providing a first level of high-speed lookup. Once the correct host is found, the server can travel through the set of ICEXPIRE regular expressions that apply to that host, until a match is found. Each regular expression is specified with the REGEXP attribute. Once a match is found, the expiration control attributes in the tag are applied to the matching URL, as described in the following sections. The remaining two attributes describe a fixed expiration and a minimum expiration. The uses of these attributes are described in the following sections.

3.4.4 Fixed Expirations

The most typical use of ICEXPIRE causes all URLs matching the regular expression to be assigned a specific expiration date:

⟨ICEXPIRE HOST = www.cnn.com

REGEXP = "http: // www.cnn.com/ sports /.*"

EXPIRATION = "Thu, 30 Jan 1997 11:12:13 GMT"⟩

In the above example, all URLs on www.cnn.com that are under the sports section are set so they expire on January 30 at the specified time. The expiration date can also be specified in seconds relative to the current time. In the following example, all matching content gets an expiration date 600 seconds from the time it was retrieved:

⟨ICEXPIRE HOST = www.cnn.com

REGEXP = "http: // www.cnn.com/ sports /.*"

EXPIRATION = "+600"⟩

3.4.5 Conservative expirations

Some sites may not want any of their content cached at all. These are sites whose content changes rapidly or unpredictably, or whose content is extremely short-lived. An ICEXPIRE whose EXPIRATION attribute is set to the special value ALWAYS tells the server that all content satisfying the lookahead tag's match criteria are to always be verified from the network, and satisfied from the cache only if the content has not changed. The result is poorer performance but greater accuracy.

⟨ICEXPIRE HOST = www.cnn.com

REGEXP = "http: // www.cnn.com/ sports /.*"

EXPIRATION = ALWAYS⟩

Content providers are thus able to control the behavior of the content without modifying the content itself. The expiration meta-data can be applied at an arbitrarily fine granularity by tuning the ICEXPIRE regular expression appropriately.

3.4.6 Liberal expirations

At the other end of the spectrum are sites that never want their content to expire. These types of sites contain content that appears once (possibly for a very short time) and never changes. Examples are newspaper or journal articles with URL identifiers that are never re-used. For this type of content, a special value NEVER is provided for an ICEXPIRE EXPIRATION attribute. The value works exactly as above, except that content matching the lookahead configuration never expires.

⟨ICEXPIRE HOST = www.cnn.com

REGEXP = "http: // www.cnn.com/ sports /.*"

EXPIRATION = NEVER⟩

3.4.7 Minimum Expirations

Expiration dates computed with the automatic expiration algorithm described in Section 4.1 Automatic Expiration Control, can sometimes yield non-intuitive results. If, for example, an object is retrieved immediately after it is modified, and the object does not have enough lifetime samples, the resulting new expiration date will be very short, causing the object to expire earlier than it should.

Content providers can override an expiration date calculated by the algorithm with a minimum value. If the expiration date computed by the algorithm is below the minimum, the minimum is used. The minimum expiration is defined in the MIN_EXPIRATION attribute of the ICEXPIRE HTML tag. It can be specified as a time in seconds relative to the time it was retrieved, or as an absolute date in standard HTTP format.

⟨ICEXPIRE HOST = www.cnn.com

REGEXP = "http://www.cnn.com/sports/.*"

MIN_EXPIRATION = "+600"⟩

In this example, all matching content has its expiration calculated using the automatic expiration algorithm, but if that result is less than 600 seconds from now, the expiration is set to 600 seconds from now.

⟨ICEXPIRE HOST = www.cnn.com

REGEXP = "http://www.cnn.com/sports/.*"

MIN_EXPIRATION = "Sun, 2 Feb 1997 10:10:10 GMT"⟩

In the second example, the behavior is identical, but the minimum expiration is a specific time in the future.

3.5 Lookahead

3.5.1 Overview

One of the major areas where the caching server adds value is in lookahead (pre-fetch of content). Most caching is based on past usage of the network: the user visits a site and their web browser stores that site's content for a set period of time. If the site is re-visited, the content is fetched locally, rather than over the network.

According to one embodiment, lookahead caching uses predictive algorithms to determine where a user may go given their current location. Lookahead caching then attempts to fetch the desired content before the user actually travels to the new location. Thus, when the user actually travels along a web link to a new page, that page is already present locally and can be displayed very quickly.

Figure 5:
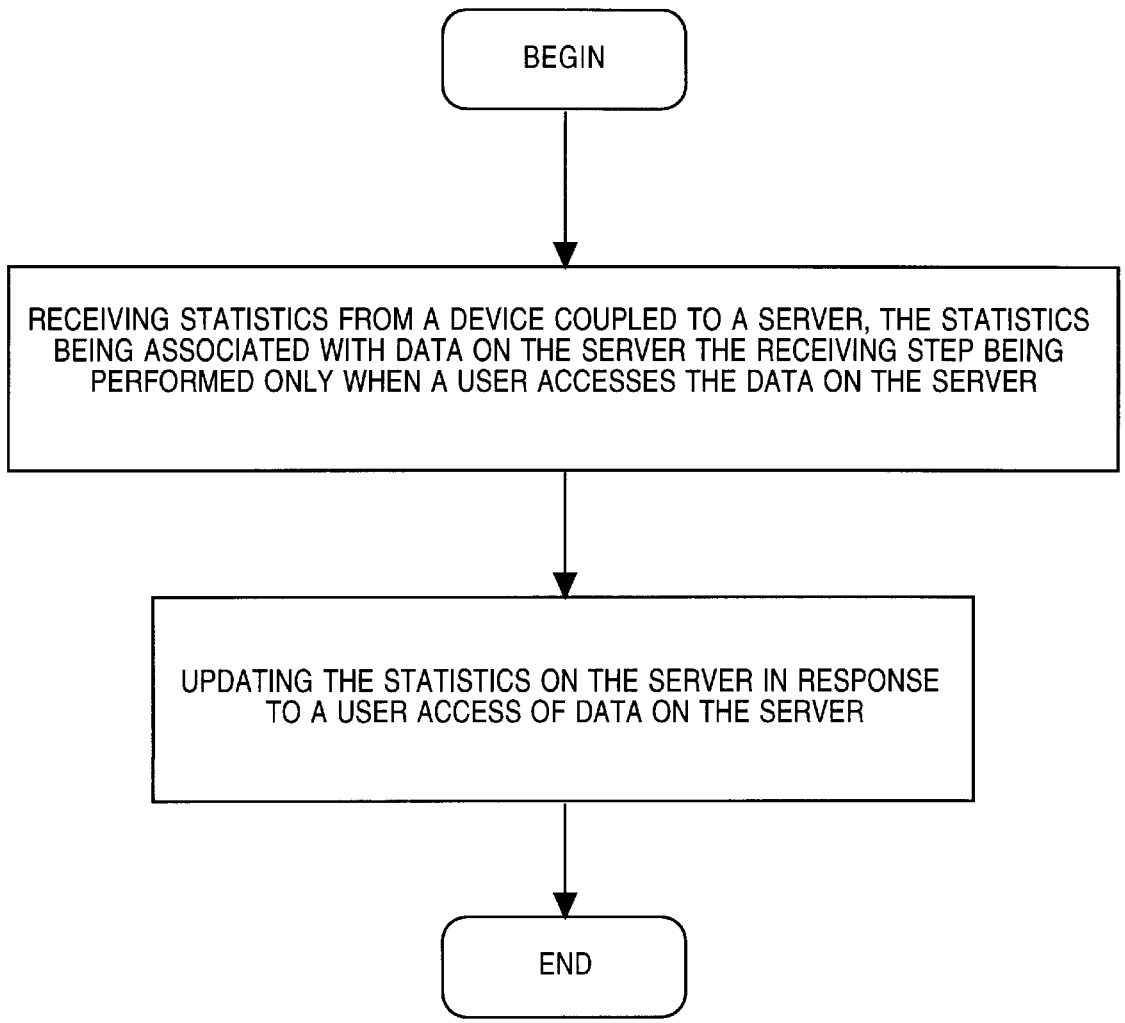
Figure 6:
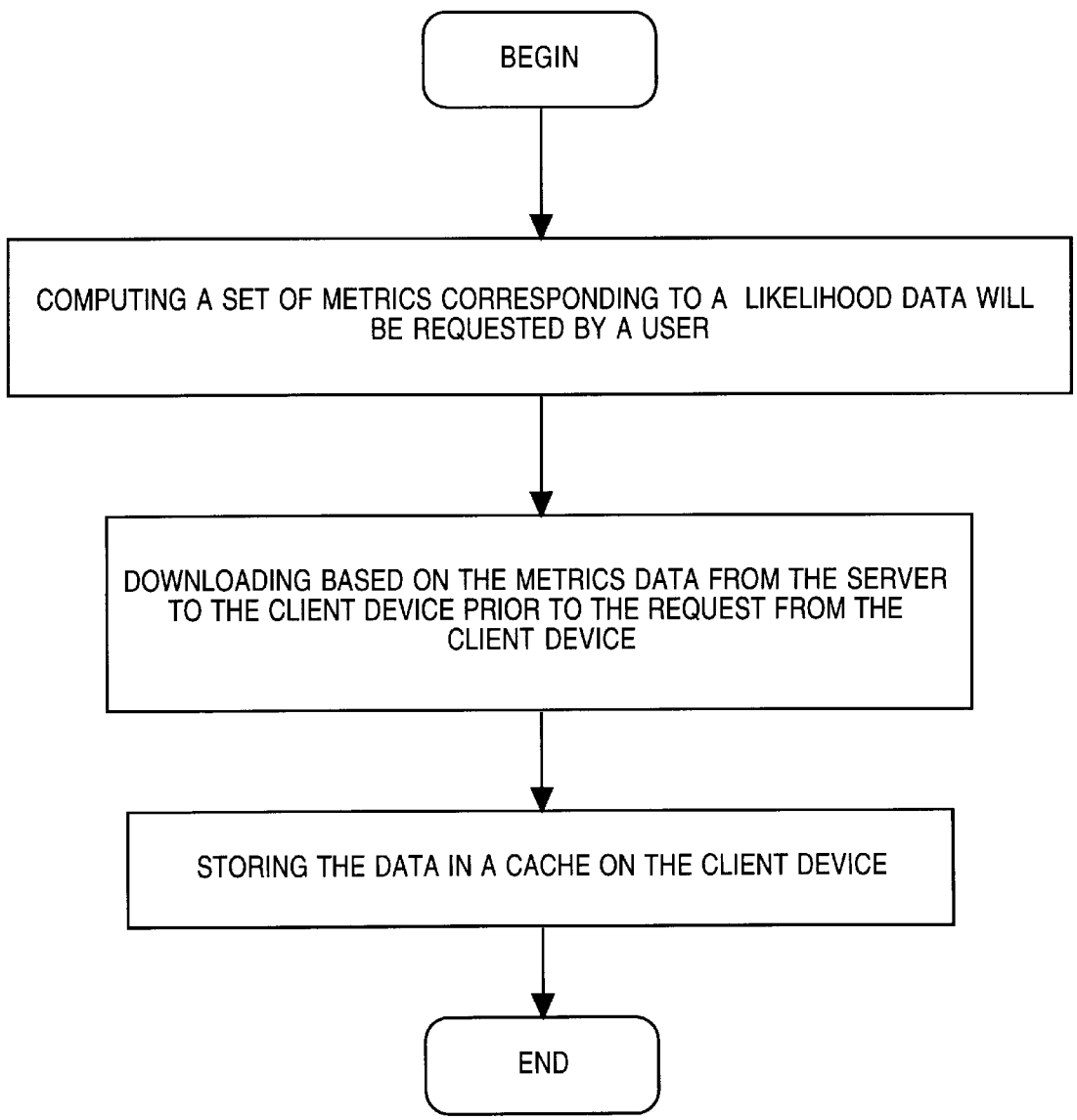

A number of different mechanisms allow content providers to tune the lookahead algorithm with a great degree of flexibility for their particular site layout. According to one embodiment, the lookahead algorithm runs on the caching server. The lookahead algorithm uses tuning information created by content providers and maintained by a publisher's back-end server. Statistics gathering mechanisms are integrated with lookahead tuning, creating a feedback cycle where usage of a site causes statistic uploads to the back-end server, which then automatically aggregates and updates the tuning information and downloads the result to all subscriber caching servers. FIG. 5 is a flow chart illustrating an overview of statistics gathering according to one embodiment. FIG. 6 is a flow chart illustrating an overview of one embodiment of lookahead caching.

3.5.2 Terminology

Following are some terms used in the next sections:

Initial page

Whenever the user requests a page from their web browser, that page is looked ahead upon. That user-requested page is known as the "initial page".

Child page

A page reachable via URL from a "parent page". The lookahead algorithm works by analyzing child links of the initial page, and then recursing on the pages pointed to by each child link.

Parent page

An HTML page whose children are analyzed by the lookahead algorithm.

Lookahead Level

Also known as "lookahead depth". The number of links between the initial page and the current page. A lookahead level of 1 includes all child pages of the initial page, together with their inline images and applets. A lookahead level of 2 includes the child pages of each child page of the initial page, together with their inline images. Repeat for levels 3 and 4. Levels of 3 and above include an enormous number of pages.

Positive filter

A regular expression applied to child link URLs. If the URL matches the expression, the lookahead algorithm continues at that point, otherwise it stops.

Negative filter

As above, but lookahead continues only if the URL does not match the regular expression.

Weight

An arbitrary number assigned to a child link, representing the probability relative to its siblings that it will be traversed by the user.

Score

The relative importance of one lookahead request relative to all other requests currently queued. This includes requests made from other browser windows, or by other components of the system.

3.5.3 Algorithm Overview

According to one embodiment, the caching server's lookahead algorithm starts by assigning a score to an initial page. When the page arrives, the caching server scans the page for child links to other pages. The caching server then assigns each of these child pages a "weight," or likelihood that the child pages may be traveled along by the user. The weights are numbers that represent the likelihood relative to other pages on the site that that page may be accessed. The weight is the content provider's opinion of the page's access likelihood relative to other pages. According to one embodiment, the user's actual browsing behavior is not taken into account in determining the weight.

According to an alternate embodiment, the user's browsing behavior is also examined. Both weight and browsing behavior are then fed into an algorithm, together with the parent page's score. That results in a child page score. The caching server then queues requests for all the child pages in descending score order and begins fetching them. The algorithm has the property that the child link scores, when added together, result in the parent page's score. The scoring algorithm is described in detail in the next section.

According to one embodiment, lookahead processing is recursive. As soon as a lookahead request completes, the retrieved page is analyzed for links and the same scoring algorithm is executed over those links to yield a set of probabilities that they will be traveled along if the parent page is reached. Because a given page's links'scores all sum to the parent's scores, this embodiment of the algorithm has the desirable behavior that all lookahead requests generated from a given page have scores that preserve the likelihood relative to one another that the page will be selected by the user. The algorithm also has the desirable behavior that it converges automatically. Each page's score gets smaller the farther it is from the original page. Eventually it reaches zero, at a rate inversely proportional to its weight and the weights of its parents. The higher a link's weight, the larger percentage of its parent's score it will receive and propagate to its children.

The algorithm is halted as soon as the user requests a new page. The algorithm is then started from the new initial page.

Any existing lookahead requests remain queued, but their scores are set to zero. If they appear in the new run of the lookahead algorithm, then their scores will be assigned as appropriate, relative to the user's new position. Once the new run completes, any leftover requests with zero scores are eliminated, since it becomes highly unlikely based on the algorithm that the user will want those pages. This behavior has the desirable property that the number of queued lookahead requests remains bounded and doesn't consume too much caching server resource.

Many instances of the algorithm can run in parallel. The caching server can, for example, run an instance of the algorithm for each browser window that the user has active. If the caching server runs as a network service used by multiple users each with their own browsers, then the caching server can run an instance of the algorithm for each browser. Furthermore, the caching server can run an instance of the lookahead algorithm for each subscription (see following) that the user has created.

Each algorithm instance runs in parallel with the other algorithms, and can have its own configuration. The scores resulting from each algorithm's analysis are all absolute, meaning that the score assigned the initial request is the only way for one instance's resulting lookahead requests to be more important than any other instance's requests.

3.5.4 Child Scoring Algorithm

According to one embodiment, a child link's score has three inputs: the user's past browsing behavior on that link's page, the content provider's weight for that child page relative to the other pages on the site, and the parent's score. Inline images, applets, and certain other objects are always assigned their parent's weight. Objects of these types are always automatically requested by the browser whenever the browser sees their links, so by definition they are as likely to be accessed as their parent, hence getting their parent's weight.

HTML pages are more difficult to score. The algorithm must pay most of its attention to the content-provider-assigned page weight until the user's browsing behavior becomes statistically valid. In the absence of any user input, the content provider clearly has an idea of how their content is used, particularly when their weights are determined via a statistic gathering mechanism (described later). The algorithm assigns the right proportion of user behavior and content-provider-assigned weight to the score so that the more the user visits the site, the more his or her input is valued.

The algorithm also weighs user behavior such that a user need only visit a small site (site with a small number of pages) a small number of times to get a statistically valid surfing sample. A user must correspondingly visit a large site (site with a large number of pages) a large number of times to get the same statistically valid sample. For the lookahead algorithm to correctly represent probabilities, the sum of all child page scores on a parent page must sum to the parent page's score.

According to one embodiment, the algorithm is logarithmic to allow the user's behavior to overwhelm the content provider's weighting as soon as statistically possible, then level off as the user visits the site more and more, so that there is always a minimum effect from the content-provider's weights. A piece-wise linear approximation may also be utilized.

According to one embodiment of the present invention, the algorithm is as follows:

```
p = parentScore * [ ( M1(n, nHits) * ( nHits / totalHits) ) +
        (M2(n, nHits) * (weight / totalweight) ) ]
if hits <= 3n, then
    M1(n, nHits) is: hits / 4n
    M2(n, nHits) is: (4n - hits) / 4n
if hits > 3n, then
    M1(n, nHits) is: hits / (hits + n)
    M2(n, nHits) is: (n / (hits + n)
n = max(1, totalLinks / 4)
``` nHits is the number of times the child page has been accessed by the user. TotalHits is the total number of times all pages accessible from the parent page have been accessed by the user. Weight is the child page's content-provider-assigned page weight. TotalWeight is the total of the weights of all pages accessible from the parent page. N represents the size of the site and is described in detail below. Functions M1 and M2 are both scaled by percentages, M1 by the percentage of all the parent page's children that this child has been hit, and M2 by the percentage that this child's weight is of the total child weights on this page. Each of the two scaled terms of each child page will therefore sum to the parent's total, giving the desired behavior that the sum of all child scores is the parent score.

A piece-wise linear approximation of logarithmic behavior is obtained by dividing the scoring algorithm into two areas, one used when the number of hits is less than 3N and one when the number of hits is greater than 3N. The "knee" in the approximated curve occurs when the number of hits is exactly 3N. Variable N is used instead of a constant number of hits to parameterise the knee in the curve by the size of the site. The user is not granted a statistically valid browsing sample until the user has accessed a certain percentage of a site. Otherwise the user's browsing activity would be too heavily too quickly on a small site for adequate behavior in a large site, or too heavily too slowly on a large site for adequate behavior for a small site.

The two functions M1 and M2 are complementary. M1 (the user-behavior term) gets larger and M2 (the content-provider term) gets smaller the more the user visits the site. The M1 value increases and the M2 value decreases rapidly in the first part of the algorithm, where the user has hit the site fewer than 75% of the total number of links (3N=3* (number of links/4)). In a site with 28 links, for example, after 7 hits, the user behavior is weighted 25% and the content-provider 75%. After 14 hits, the relative percentages are 50—50, and after 21 hits, 75/25.

After this point the algorithm drops into a slower mode, where the percentage of user-derived behavior increases slowly relative to the content-provider-derived behavior. After 28 hits in the above example, the relative percentages are 80/20. The number of hits has increased by 50% but the percentage of user-derived behavior is has only risen 5%. Thus, in the beginning, almost all of the child's score comes from its weight over the weight total. As the number of hits increases, more and more of the score comes from the number of hits, until finally it levels off at a contribution of 75% to the total score.

3.5.5 Default Weight Assignment

Proper assignment of link weights is crucial to correct lookahead behavior. The caching server can automatically assign weights to each link. Given that the caching server knows nothing about the site's semantics, however, there is no way for the caching server to do more than make basic assumptions about link placement and use those assumptions to assign weights. By comparing the link placement to a number of different stored profiles, the caching server can apply one of a suite of link assignment algorithms to the page.

Alternatively, according to one embodiment of the present invention, weights can be assigned in exponentially decreasing magnitude to links as the links are encountered on the page. This embodiment is based on the assumption that links near the start of the page are more likely to be traversed than links farther down the page. The algorithm divides links into two categories: links on the same site as the parent page, and links on a different site. The algorithm gives higher weights to links in the same site. The algorithm looks for links in the order encountered in the parent page's HTML stream. The first N links are assigned the maximum weight W. After each N links, the current maximum weight W is lowered by a scaling factor S. This process continues until the W hits a minimum value. According to one embodiment, W is 256, N is 4, and S is 0.5. Thus the first four links encountered are assigned a weight of 256, the next 4 get 128, the next get 64, and so on down to 1. Other values of W, N and S may also be utilized.

Links outside the parent page's site are assigned a reduced weight, under the assumption that the user is less likely to stray from the site than stay in the site. Each off-site link is assigned a weight which is the current maximum weight W reduced by a reduction factor R. The off-site links do not count toward N, i.e. the off-site links never cause W to be lowered. According to one embodiment, R is 0.25. Thus every off-site link encountered during the first 4 on-site links gets a weight of 64, then 32 if encountered during the next 4 on-site links, and so on down to 1.

3.5.6 Custom Weight Assignment

According to one embodiment, in situations where the default weighting algorithm is inappropriate, the system allows the content provider to specify weights for each page on the site. The weights are stored in a TOC, described in Section 3.1, Bulk Validation. Each URL defined by a TOC ICPAGE tag can have its own custom weight, in addition to the standard bulk-validation information.

Each ICPAGE tag in a TOC contains, in addition to the member URL name and its validation information, a content-provider-supplied weight:

(ICPAGE URL = http: // truth.incommon.com/ library/ achannelshtml

WEIGHT = 1234 LASTMOD = 84762964)

That weight is then used in place of any weight calculated by the caching server's default weight assignment algorithm. The TOC can initially be generated automatically by the back-end server, with default weights assigned via the algorithm described in the previous section. As caching servers run on many client machines, they upload their usage statistics to a central collection point. Each caching server uploads a version of its TOC periodically, the exact frequency being defined by the content provider as part of the TOC data. The uploaded information contains each TOC member URL and the number of times the uploading caching server has accessed the particular member.

The result of the uploads is an exact picture of the site's usage patterns, on a per-URL basis, automatically grouped by TOC. In addition to being valuable site organization data, the hit counts can be aggregated manually, automatically, or a combination of both, and fed back into a new version of the TOC, which in turn is downloaded to the caching servers as their copies of the TOC expire. This feedback cycle automatically tunes the lookahead algorithm on a per-TOC basis, exactly in accordance with actual usage patterns.

3.5.7 Other Lookahead Configuration

While weight calculation and page scoring are the foundation of successful site lookahead, the lookahead algorithm can also be configured along several other axes. Moreover, the algorithm can be configured separately for different sites, even for different subscriptions in the same site. Each configuration is described by a piece of meta-data called an ICLOOKAHEAD tag. That tag can be placed anywhere, and typically appears in one of two places. According to one embodiment of the present invention, the tag can be placed in a site meta-data page along with other meta-data, such as pointers to TOC information, or regular-expression-based ICEXPIRES expiration tags. According to another embodiment, the tag can be transmitted as MIME data in channel subscription notification data. In both cases, the configuration itself is identical but retrieved differently.

The lookahead configuration tag controls the following algorithm parameters in addition to the custom expiration data described earlier in this document:

maximum depth
maximum number of links
pruning regular expressions
pruning file types
lookahead off site or not
lookahead out of TOC or not
lookahead on images, audio, or video
lookahead for a maximum amount of time
lookahead to a maximum amount of data The configuration scheme is HTML and is therefore easily extensible. Following is an example of the ICLOOKAHEAD tag and its attributes:

```
<ICLOOKAHEAD DOMAIN_NAME=cnn.com
HOST_REGEXP=.*.cnn.com
    MAX_DEPTH=2 MAX_LINKS=50 NO_GRAPHICS=FALSE
NO_OFFSITE=TRUE
    PROCEED_IF_MATCH=".*/topstories/*.html">
```

In addition to lookahead configurations that are bound to channel subscriptions, the content provider can have any number of lookahead configurations bound to site (host) name regular expressions. According to one embodiment in order to improve performance, the caching server uses a two-stage lookup mechanism similar to that used by ICEXPIRE tags. In this case the first stage is the host's "domain", i.e. the last two labels of the host name. The domain is stored in a hash table and can be looked up quickly. Whenever a page is looked ahead on, its URL's host name's domain is looked up in the hash table. If an entry is found, all lookahead configurations for that domain have their host name regular expressions compared against the URL's host name. The configuration whose host name regular expression first matches the URL's host name is used to configure lookahead for that URL. The two-stage lookup algorithm thus ensures that domains with no custom lookahead are not slowed by domains with lots of custom lookahead.

3.5.8 Depth Configuration

The maximum depth parameter controls how many levels of links are chased by the lookahead algorithm. Level one lookahead consists of the current page's links and all of their inline images. Level two lookahead consists of level one lookahead plus each child page's links and all of their inline images. Levels three and four extend the algorithm further.

Traditional "spidering" algorithms chase all links to a specific level. The result is an explosion of requests at levels above two, rendering the spidering almost useless unless the user has high-speed network access and lots of time on their hands.

One embodiment of the present invention uses a combination of level and lookahead score to regulate lookahead and keep it effective. Any potential lookahead request below level one must have a score above a minimum cutoff in order to be considered. The cutoff score is 1/50 the original page's score. Thus as the lookahead algorithm gets farther and farther removed from the original page, the scores it derives get smaller and smaller, until they fall below the cutoff.

Scores do not drop uniformly but rather according to the relative importance of the various links traversed. If one link on a page has 75% of the total score on that page, the other links at its level may all have scores too low to allow lookahead to continue through them. The page with the large score may, however, have a score large enough for it and its children to be looked ahead on. This depends on the page scores, which in turn depend on user behavior and content-provider-driven behavior. The merging of cutoff score, the scoring algorithm, and level control gives the content provider exact control over how lookahead is performed. The result is far more accurate than traditional spidering.

3.5.9 Link Count Configuration

Link counts are the second parameter to lookahead configuration. The content provider can control the maximum number of links looked ahead on the initial page. The link count applies only to the initial page's links. Their child links are looked ahead according to cutoff score, as detailed in the algorithm description previously.

Link count creates flexibility for content providers. Normally, all links off the initial page are looked ahead on. Lookahead score is used only to prioritize the requests. If the initial page has a large number of links, however, the algorithm may spend too much time looking ahead on links unlikely to be traversed by the user. By restricting the link count to a smaller number, the lookahead algorithm can complete more quickly, and spend its time analyzing subsequent pages.

3.5.10 Lookahead on Images, Audio, Video

According to one embodiment, the lookahead algorithm can be further tuned by being configured not to look ahead on images, audio content, or video content. These types of content are typically much larger than HTML pages, and therefore take longer to download. In the time taken to download a single JPEG image, for example, the server could download ten or fifteen HTML pages. In the time taken to download a single WAV file (audio file) tens of HTML pages could be loaded. The savings is even greater for video content.

Users generally want images. Content providers also general wish images downloaded, particularly if the images are advertisements. Occasionally, however, site images are not important relative to the text on the page. In those cases, the content provider may want to disable lookahead on the images and download the text content much more rapidly. Audio and video, for example, tend to be much less important to the look and feel of a page, and may therefore typically be disabled. In addition, image, audio, and video lookahead can be tuned so that rather than either happening at parent priority or not all, they happen below parent priority, possibly after all text lookahead has completed.

3.5.11 Pruning Regular Expressions

Figure 7A:
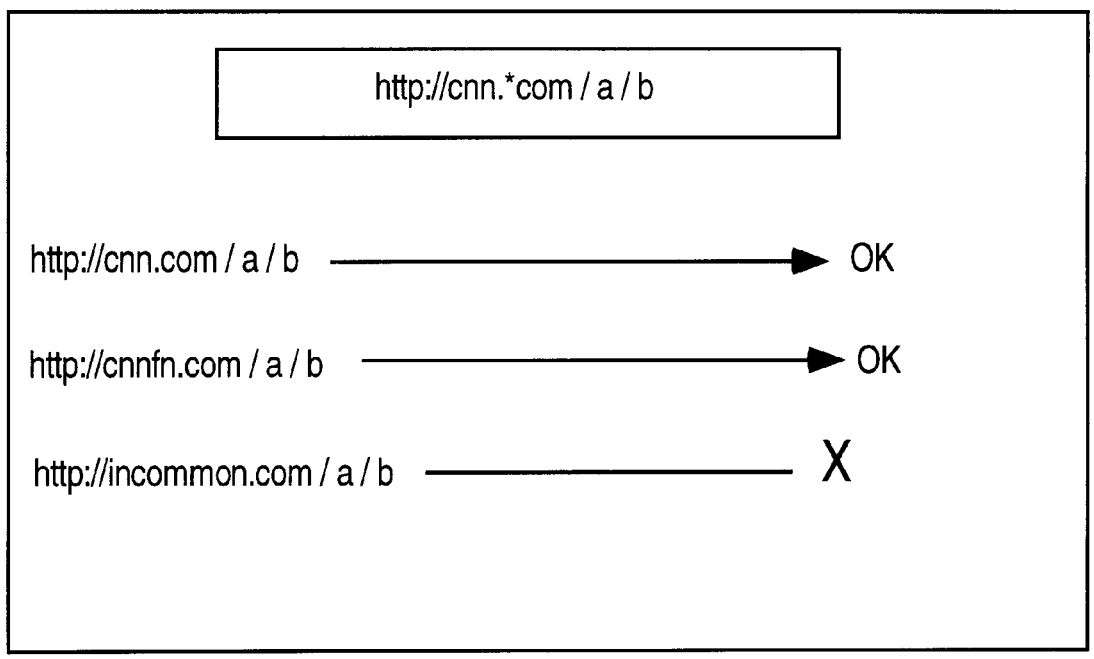
FIG. 7A illustrates a regular expression used as a "positive filter" for links on a page.
Figure 7B:
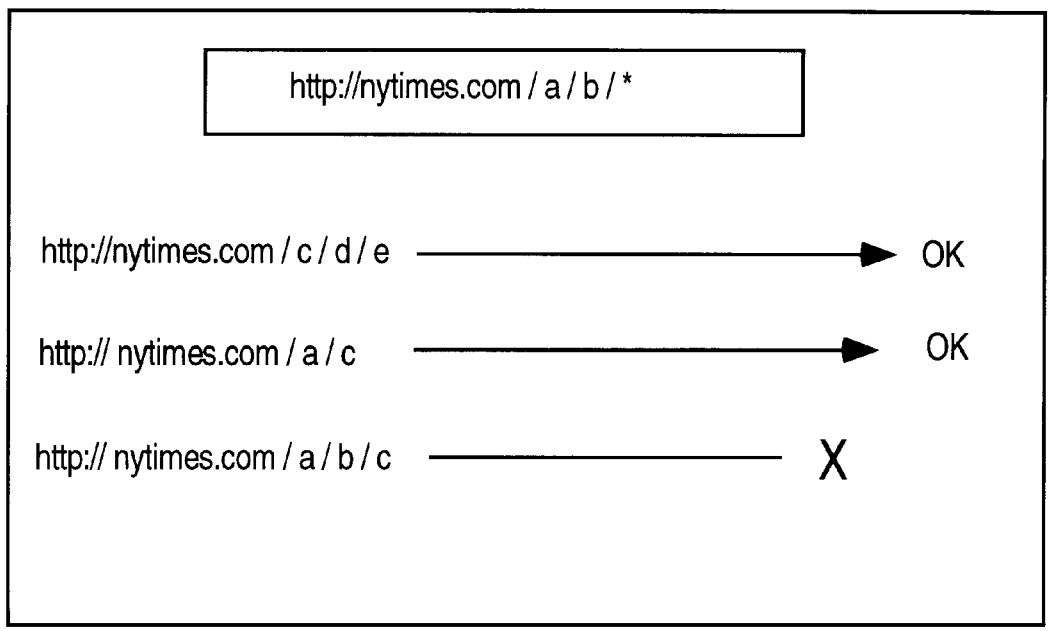
FIG. 7B illustrates a regular expression used as a "negative filter" for links on a page.

The content provider can create two regular expressions in each lookahead configuration, as illustrated in FIGS. 7A–B. One expression is used as a "positive filter" for links on a page. For a page link to be considered for lookahead, its URL must match the positive-filter regular expression in FIG. 7A. The regular expression syntax used is not important, as long as it has the functionality to match a reasonable variety of URLs without too much work by the content provider. In the following examples, the regular expression language is that used by the GNU Emacs text editor. Examples of other equally usable languages are those used in the Posix Unix standard, Microsoft Developer Studio, the Unix "egrep" program, or the Epsilon text editor.

The second regular expression is used as a "negative filter" for links on a page, as illustrated in FIG. 7B. For a page link to be considered for lookahead, its URL must not match the negative-filter regular expression. This type of regular expression is useful for screening out certain types of links that the content provider wants never to be looked ahead on. Typical candidates are executable files, full-motion video, or sound files.

3.5.12 Lookahead Off Site

This lookahead tuning parameter is a Boolean value that controls whether lookahead is performed on "off-site" links. Off-site links are defined to be those links whose URL host component is different from the host component of their parent page. Content providers may set this value to "no lookahead off-site" if they do not wish the caching server to expend resources such as network access time, processing time, or disk storage looking ahead for pages not owned by the content provider.

3.5.13 Default Lookahead Configurations

Just as the caching server has a default link weight computation algorithm for use in cases where the content provider does not provide explicit weights in their TOC meta-data, the caching server also has default lookahead configurations for cases where the content provider has no applicable ICLOOKAHEAD information in their site meta-data, or no lookahead configuration is provided with a subscription channel notification. According to one embodiment, the caching server uses two similar default lookahead configurations, one for browser-based lookahead and one for channel-subscription-based lookahead. Additional configurations can easily be stored, and the existing configurations may also be modified by the end user.

The default configuration currently used by the caching server for browser-based lookahead has the following settings:

Maximum depth 1 (initial page's children and their inline images)

Maximum links 50 (the first 50 links encountered on the initial page)

Lookahead off-site

No positive-filter regular expression

Lookahead on images, but neither audio nor video

Negative-filter regular expression to remove executable files, server-side image maps, and binary data files 3.6 Subscriptions and Notification Once a user subscribes to content from a publisher, that content must be delivered to the user's desktop. This section describes the process by which a user subscribes to content, and it describes the system that pushes notification data from the publisher to the user's desktop.

Creating a subscription is intended to be a simple, light-weight process, for example a single click of a button on a web page by the user. Similarly, deleting a subscription is a simple operation performed on the content bar by the user. Subscribing to content begins the flow of notifications from the content provider to the user. Unsubscribing terminates the flow of notifications, guaranteeing that the user sees no more information from that subscription.

The subscription process is also intended to be highly configurable. There are a number of different notification mechanisms available to the publisher, and each is appropriate in different situations. The notification system allows the content provider and the client to negotiate notification mechanisms, and further allows restrictions by intranet administrators, so that clients on private networks operate under rules defined by the network administrator no matter what the information publisher wants.

3.6.1 Service Requirements

The following describes some of the different areas that a notification service must address:
shared data
personalized data
reliable delivery
confirmed delivery
store-and-forward delivery
internets and firewalls
security
anonymity
user control over subscriptions 3.6.1.1 Shared Data According to one embodiment, the notification system must be able to handle effectively data shared by a large user community. Given that the data is shared, notifying subscribers of its presence is most effectively performed by a multicast protocol. Multicast protocols save network bandwidth, improve origin server performance by sending only a single copy of the data, and keep the origin server from having to maintain subscriber lists (although such lists may be maintained for other reasons).

3.6.1.2 Personalized Data

At the other end of the spectrum is highly personalized data, such as stock portfolio updates and personalized newspapers. The network overhead of maintaining multicast groups in this instance is wasted because there is only ever one recipient of the data. Instead, the system must be able to unicast notification data, or at least an indicator that such data is available.

3.6.1.3 Reliable Delivery

Publishers originating notification data need to know that their subscribers will receive the data. "Reliable" in this context is fairly basic, on the order of email-based reliability. The system must guarantee that the data arrive at all subscribers "eventually", with the publisher having at least some control over the maximum time beyond which it knows that 99% of the subscribers have received the data.

3.6.1.4 Confirmed Delivery

Confirmed delivery takes reliable delivery one step farther. The publisher not only needs to know that its data will eventually be received by all subscribers, they also need to know which subscribers received the data and at what time. Such a system requires subscriber lists, with individual subscribers contacting the publisher on receipt. This type of return-receipt-request may have an impact on the performance of the system.

3.6.1.5 Store and Forward Delivery

A class of subscriber machine that is not always connected to the network includes laptops that dock with a networked station periodically, or a machine that dials into the network periodically to pick up information. Another class of machines uses DHCP (Dynamic Host Configuration Protocol) for dynamic IP address management. Such machines may overlap with the previous class of machines, but also include desktop machines permanently connected to the network but whose addresses are managed dynamically.

Both classes of machines can benefit from using a proxy notification server that is responsible for handling incoming notifications and buffering them for the user. If such a service is not available, frequently-disconnected machines will be forced to poll, since they cannot count on receiving the notifications. DHCP machines are forced to poll if they operate in a unicast-only environment, because unicast requires address lists, and it is not possible to maintain address lists effectively if the addresses change constantly. Using host names for address transparency does not work either, because many of the machines do not have names.

3.6.1.6 Internets and Firewalls

The notification system must be general enough to perform well in an intranet context as well as in an Internet context. One obvious problem with use on the Internet is that the publishers and their subscribers will frequently be on opposite sides of a firewall. Firewalls are frequently configured to let requests out into the Internet, but to bar unsolicited information other than email from travelling into the intranet.

The notification system needs to function reasonably well in a firewall environment that behaves in this manner. The notification system also needs to offer notification functionality that is simple enough that network administrators can scope any security issues easily. The fewer the security concerns, the more likely notifications may be allowed through a firewall by network administrators who believe the benefits of asynchronous notifications in terms of network bandwidth savings make it worthwhile to reconfigure their firewall software.

3.6.1.7 Security

The notification system uses existing security infrastructure to give subscribers assurance that incoming notifications are indeed from the desired publisher, and not from a malicious third party. In addition, notification data is encryptable.

3.6.1.8 Anonymity

Subscribers may wish to remain anonymous from publishers. The notification system must be able to provide a level of indirection between publishers and subscribers that implements anonymity. A multicast notification system by itself does not guarantee anonymity. Instead, the system needs to use proxy notification servers that act on behalf of client wishing to remain anonymous.

3.6.1.8 User Control over Subscriptions

Once a user creates a subscription, he or she must be able to remove that subscription and know that the system will immediately stop accepting notifications for that subscription. This gives the user fine-grain control over the types of information he or she receives and does not allow the provider undue privilege. This is a key solution to a major problem with electronic mail: unsolicited email. Email as a notification mechanism, operates at too gross an addressing level. By giving one's electronic mail address to a publisher, the user loses the ability to screen out future unwanted information from that publisher, and has no control if that publisher passes the email address to someone else. The key to solving this problem is the scheme of registration and subscription where the user retains control of whether to accept or reject information on a fine-grain subscription level.

3.6.2 Notification Services

The following section describes in detail the different components of the notification system and how the components implement the various notifications requirements.

3.6.2.1 Components

The system comprises the following components:

Client drivers, one per notification mechanism.
Unreliable ping protocol, either unicast or multicast
Unreliable notification protocol, intended for multicast
Synchronous request algorithm
Return-receipt support
Backup polling algorithm
Notification proxy server
Subscriber list management
Subscription meta-data describing parameters in section 3.2 Meta Data.

3.6.2.2 Client Drivers

According to one embodiment, notification services are implemented as loadable "drivers", each implementing a common service interface. A partial list of operations follows:

start
stop
subscribe
unsubscribe
show-configuration
configure

According to one embodiment, in order to implement a new notification mechanism, the standard driver interface is implemented. A common notification system manager handles all generic tasks, such as subscription validation, driver management, and delivery of information to the caching server.

3.6.2.3 Reliability and Notification

The system does not attempt to notify using a reliable transport protocol. As far as the user is concerned, the high level notification process provides reliable delivery, but the system implements reliable delivery by using a combination of lightweight unreliable asynchronous notification, synchronous requests, and backup polling.

There are a number of problems with reliable transport. In the multicast world, reliability is difficult to implement well. Protocols like RMTP, for example, deal with various aspects of reliability, but at the expense of complexity. In the unicast world, reliable transport via TCP is easy to implement, but does not provide any bandwidth or server performance savings over unreliable notification followed by synchronous requests. In fact, the latter mechanism can provide higher performance than reliable unicast if caching servers are used (see following).

According to one embodiment of the present invention, asynchronous notification is implemented by providing an unreliable multicast atop IP multicast, and a very simple unicast "ping" protocol. Unreliable multicast over LANs will end up being reliable most of the time without requiring all the additional protocol complexity. Unicast will simply provide ping functionality, since transmitting the data itself to all recipients takes longer than asking the recipients to ask for the data.

3.6.2.4 Unreliable Ping Protocol

In the unicast world, asynchronous notification by transmitting the entire notification is not practical. The publisher becomes responsible for sending a copy of the data to every subscriber, which is no different from the subscribers asking for it, providing the subscribers never ask unless there is new data available.

The "ping" protocol implements a means for the publisher to notify subscribers that new data is available for them to retrieve. This protocol immediately improves performance over simple polling because subscribers only ask for data when new data is available. The process is analogous to the post office leaving a user a note that there is a package waiting to be picked up. The user does not have to drive to the post office every day, but rather only when a note tells the user that a package is waiting.

Each subscriber thus needs to request data from the server. In the case where the information is shared and public, whenever a subscriber receives a ping, they wait a random amount of time before requesting the information. The first subscriber on a network segment requests the data of a caching proxy server or notification proxy. That entity then requests the data of the publisher. The random wait prevents all subscribers from asking at once, and increases substantially the likelihood that they can get the data from a cache instead directly from the publisher, thus reducing server load. Even if there are no intermediaries between the subscriber and the publisher, the random wait distributes the load at the publisher.

If the data is not shared, then each subscriber does have to request the information from the publisher. But the overhead of transporting the information from publisher to subscriber would still have to happen once per subscriber. Multicasting personalized information does not render a benefit. Having the subscriber request the information is better than the reverse because the mechanisms already exist, they pass through firewalls, and they do not require additional store and forward infrastructure at the publisher.

The ping protocol is inherently unreliable, thus requiring a mechanism to deal with lost pings. Sequence numbers incremented by one may be used for each notification sent by the publisher. A subscriber that sees a hole in the sequence space simply asks for the missing notification(s). This mechanism is only necessary if the notifications comprise a stream of data, all elements of which must be received by the subscriber. If new notifications subsume older ones, then the sequence scheme does not need to be used.

Whether or not sequencing is used, the system also has to handle situations where no notifications arrive for "too long". "Too long" is a time period defined by the publisher in the subscription meta-data sent to the subscriber at subscription time. When that time period elapses with no notifications, the subscriber polls the publisher for any changes and resets its timer. Whenever a notification arrives, the time period is reset, so that a poll only occurs N minutes after no word has arrived from the publisher. As long as the publisher's notifications arrive at regular intervals driven by the content, polling will almost never occur. Polling will occur only in the unlikely event that a packet was dropped between the publisher and the subscriber, or in the case where the subscriber's machine was disconnected from the network for a sufficiently long period of time.

The ping protocol works as follows: A single UDP packet is sent to each subscriber. In multicast configurations, the packet is sent to the subscription's multicast group. The packet contains the following information:

Publisher host name
Subscription identifier
Sequence number
URL to request, if it changes constantly and cannot therefore be part of the subscription meta-data. URL is parameterised by subscriber identifier.

3.6.2.5 Unreliable Multicast Protocol

Delivery of actual notification data in multicast-enabled environments incurs bandwidth savings and performance gain on servers that do not need to waste time sending multiple copies of the data. LANs are generally reliable and the likelihood that a multicast notification will be received in its entirety is high. Backup request and polling mechanisms may thus rarely be required.

According to one embodiment, the protocol must provide error detection, so that subscribers know if they missed a packet and can request the data of the server directly. A simple packet sequencing scheme works just fine, and a higher-level notification sequencing scheme tells subscribers when they have missed a complete series of packets, or the last packet of the previous notification.

The notification data is broken up into UDP packets with the following header information:
Publisher host name
Subscription identifier
Data checksum
Data length
Return-receipt URL, parameterised for subscriber identifier
Notification sequence number within subscription
Packet sequence number within notification
last-packet indicator The notification data is broken up into packets by the protocol, and each packet is then multicast to all interested parties. The last packet in the message is tagged with an indicator so that recipients know when the message has been received. The protocol ensures that as few packets as possible are dropped. The protocol can easily combine packets into groups and wait a fixed small amount of time between transmissions of the next group. The publisher may use S-MIME to sign and optionally encrypt the notification content to ensure authentication security.

3.6.2.6 Synchronous Requests

Synchronous requests are an integral part of the overall system's reliable-delivery semantics, because the notification protocols are unreliable and may not even carry any data. Any time synchronous requests are used, the publisher is in danger of overloading. To minimize the risk, all synchronous requests are preceded by a random wait interval. Whenever a ping notification is received, each recipient waits a random amount of time before requesting the notification data. Similarly, whenever a broken or missing multicast notification is detected, the detecting recipient waits before requesting the data directly.

Random waiting has two direct benefits. First, if there are caching servers between the publisher and the subscriber, random waiting increases the likelihood that only one recipient will request the content of the publisher, with the other recipients getting a cached copy. Second, even if there are no caching servers in the loop, random waiting distributes the load at the publisher. Most publishers are set up to deal with high average request volumes, the notification process already eliminates spurious polling, multicast notifications will almost always be reliable, and the result is that load at the server should be manageable.

3.6.2.7 Return-Receipt

"Return-receipt" means that the publisher needs confirmation from each subscriber that a notification was received. There are obvious performance impacts, because the scheme requires both a subscriber list and direct communication between each subscriber and the publisher. The impact is most severe in an unreliable multicast environment. The system goes from one where a single copy is delivered to many unknown recipients with a high likelihood of reliability, to one where that process is followed up by N acknowledgments sent back to a publishing server which must now also maintain a list of all subscribers. The additional overhead is least felt in unicast environments, where each subscriber is already in contact with the publisher.

Return-receipt requires that the publisher maintain a list of its subscribers and mark each subscriber as having received the notification. A database is a logical choice for the list, since return-receipt subscriptions may well be highly personalized, or require payment, in which case a database with other subscriber information may already be in place. Database entries are created at subscription time and removed at unsubscription time.

There are also caching issues with some classes of return-receipt subscriptions. If the information is widely shared in a unicast environment, it still cannot take advantage of caching, since cached copies would by definition not be requested of the publisher, which would lose any return-receipt information. Instead, any URLs which identify return-receipt content must be parameterised by subscriber identifier so that the publisher can determine the subscriber who received (multicast) or is receiving (unicast with synchronous request) the content. The HTTP operation must also be marked by the requesting subscriber as "no-cache", i.e. do not serve a cached copy. Finally, in order to keep the caching server from caching many copies of the data in one embodiment, HTTP 1.1 cache control operations can be used by the publisher to prevent content being cached. According to another embodiment, in the HTTP 1.0 environment, an expiration date in the past serves the same purpose.

Return-receipt operations differ in multicast and unicast notification environments. In the unicast world, the return-receipt is implicit and occurs at the same time the content is requested. All that needs to be done is for the URL and the request to circumvent caching as described above. In the multicast world, the subscriber already has the data, and the return-receipt becomes a simple post with no data, where again the URL and request are formatted as described above. The subscriber must perform a random wait just as it would in the unicast world, to avoid inundating the publisher with requests.

3.6.2.8 Backup Polling Algorithm

If the current polling mechanism proceeds on its own, it may request information when that information is already up to date, causing spurious requests of the server and lowering performance. Instead, according to one embodiment of the present invention the polling mechanism advances its timer by the polling interval any time one of the following events occurs:

The subscriber receives an unreliable ping and follows with a request of the publisher The subscriber receives a broken multicast notification and follows with a request of the publisher The subscriber receives a valid multicast notification By advancing its timer, polling becomes a true backup mechanism, used only if no notifications arrive, or if a multicast transmission breaks. The publisher controls the polling interval via the subscription definition. The interval should be matched to the information's update frequency or to its timeliness, depending on how much the publisher trusts the notification mechanisms.

3.6.2.9 Notification Proxy Server

A notification proxy server implements the notification mechanism and uses it on behalf of a subscriber community. The proxy server stores incoming notifications, and subscribers poll the proxy periodically for any new notifications using HTTP. The proxy also stores authentication data so that only registered subscribers can use the proxy, and each subscriber has access only to its own notifications.

Candidates for proxy use are:

Laptops which are frequently disconnected from the network

Dialup users

DHCP users operating in a unicast environment

An intranet of subscribers whose network administrator does not want notifications crossing a firewall and also does not want the firewall and network overhead of all the clients doing timed poll through the firewall.

Laptops and dialup users are candidates because they are off the network often, and are therefore likely to miss notifications. That forces them to use timed poll more often than other subscribers, which may present an unacceptable load on the server or the network. Polling a local proxy may be more efficient, since a number of proxies can distribute the polling load.

DHCP users are candidates because publishers cannot effectively maintain subscriber lists when the addresses keep changing, and DHCP addresses change constantly. The publisher can try to use host names for address transparency, but desktop clients frequently do not have host names because they do not provide services. Note that in a multicast environment, DHCP hosts work fine, because they can join groups anonymously. The proxy is only useful in a unicast environment.

3.6.2.10 Subscriber List Management

Subscriber list management is only an issue in the following situations:

return-receipt subscriptions unicast notification

List management operations are performed during subscribe and unsubscribe operations. The subscribe and unsubscribe URLs reference programs or functionality built into the web server that manage a database. In the return-receipt case, that database probably already exists, for payment or personalisation management. The list of contents can be any unique identifier, since it will be given the subscriber at subscription time, and the subscriber will place that identifier in its request URL at content request or receipt confirmation time.

Lists maintained for unicast notification delivery are IP addresses or host names, since a UDP ping protocol packet are sent to each member of the list. IP addresses are easier to deal with than host names. DHCP uses either a timed poll or a proxy with a stable address.

3.6.2.11 Notification Filtering

The notification system guarantees that users will see no further notifications from a publisher once they remove that subscription. Whenever a notification arrives, its subscription identifier is checked against the list of susbcriptions currently active. Any subscriptions not on the list are ignored. In addition, the driver handling the notification can generate further unsubscribe requests and send them back to the publisher, in cast the original removal request was lost.

There are lower-level driver-specific filtering mechanisms as well; the filtering described above is a final backstop that is guaranteed to keep unwanted notifications from reaching the user. For example, in a multicast service that does not use return-receipt functionality, the driver can unsubscribe by simply leaving the subscription's multicast group. The publisher is never given any sort of client network address, so it has no means of reaching the client once the client unsubscribes.

3.6.3 Subscription Configuration

This section describes the process by which the notification system creates subscriptions. From the user's point of view, the act of subscribing to content is a very simple one-step operation. In particular, the user does not need to get involved in selecting notification mechanisms or configuring any subscription properties. All configuration is performed by negotiation between the client and the publisher, subject to any rules imposed by the client's local network environment.

When the client starts up, it configures itself according to optional meta-data that it fetches via a special configuration subscription built into the caching server (see section 3.3 Client Configuration). Part of that meta-data consists of a set of configuration HTML tags, one per notification driver. Each tag is identified by the driver's name and contains a set of driver-specific attributes used to configure the driver for use in the client's local network environment. Local network administrators can choose, for example, to disable certain drivers, guaranteeing that they will never be used to carry notifications. For example, the ICMCAST driver is disabled when the administrator puts the following configuration meta-data in their configuration page:

<ICMCAST DISABLE=YES>

Similarly, administrators can use the ICNOTIFYCONFIG meta-data tag to choose the negotiation order in which different services will be sent to the publisher, and can bind these negotiation orders to host name regular expressions:

⟨ICNOTIFYCONFIG DRIVER_LIST = "ICMCAST, ICDOORBELL"

HOST_REGEXP = ".*\.incommon.com"⟩

The ICNOTIFYCONFIG tag allows administrations to force clients to use one order when communicating with a particular host or domain, and another order for another host or group of hosts.

Once the client configures its notification services according to the wishes of the local network administrator, subscription becomes a matter of negotiating a driver with the publisher, and configuring the subscription according to its definition. When the client subscribes, it sends an HTTP request to the publisher. The request contains a list of desired notification drivers in preference order:

X-inCommon-Driver-List:ICMCast, ICDoorbell

The request also contains a configuration name/value pair for each driver, describing the driver such that the publisher will be able to send notifications to it. Each driver has its own configuration data, and not all drivers need this configuration information. The unreliable ping service, for example, needs to supply a TCP port number for the publisher's notifications:

X-inCommon-Driver-ICDoorbell:<ICDOOR LISTEN$_{13}$ PORT=2287>

The publisher picks the first driver on the driver list that matches a driver it is capable of using to send notifications. It then performs any registration that it needs to (entering subscriber information in a database, for example), and returns the subscription as an HTML page. The page contains all the information required for the client to receive notifications, including:

backup polling interval custom scheduling use of special services such as return-receipt notification driver to use and its driver-specific configuration data At this point the subscription process is complete, and notifications can begin flowing from the publisher to the client.

The notifications that arrive at the caching server can themselves modify their subscription's meta-data, changing its polling interval for example, or switching notification services from polling to multicast.

3.7 Generalized Reporting

The back-end server is also able to control caching server reporting via meta-data. Reporting meta-data is stored in a site meta-data page, just like other meta-data, such as ICLOOKAHEAD, ICEXPIRES, and TOC pointers. Reports are defined using the ICREPORT HTML tag. Each ICREPORT defines an internet domain, a set of filtering regular expressions, a report type, and an upload schedule.

The caching server periodically scans its cache as controlled by the upload schedule. Every piece of cache content whose URL matches the ICREPORT's domain is tested against the ICREPORT's filter regular expressions. The filtering expressions consist of a "match" filter and an optional "no-match" filter. Each URL must both match the "match" filter and not match the "no-match" filter if it is present.

Each piece of cache content that passes the filter then has information extracted from it that is appropriate to the ICREPORT's report type. Typical reports include hit counts, performance statistics (time required to fetch the content), or context in which the content was fetched (subscription, browser). Other reports can be created as needed, and identified by a new report type.

The reporting mechanism allows any content provider to get one or more reports on any subset of their content as stored in all client caches that access content owned by the publisher. The user need not subscribe to this content; they just need visit the site, whereupon the site meta-data is retrieved by the caching server and the report upload is configured. Because the filtering mechanism uses regular expressions, the publisher can create several ICREPORT meta-data tags, each defining reports for a different subset of their content.

The ICREPORT tag has the following attributes:

DOMAIN_NAME: the internet domain of which all matching content in the report must be a member. This domain name must also match the domain name of the site meta-data page's URL, thus preventing malicious content providers from getting report information on content that they do not own.

MATCH_REGEXP: the regular expression which cache content must match in order to be reported on.

NOMATCH_REGEXP: the regular expression which cache content must not match in order to be reported on. This attribute is optional.

REPORT_TO_INTERVAL: the interval in seconds between report uploads.

REPORT_TO_URL: the URL to which the report is delivered, via an HTTP POST.

REPORT_TYPE: the type of report desired. If this attribute is missing, the report type defaults to a hit count report.

4. Technology Local to Caching Server

The following sections describe technology local to the caching server. Algorithms in this section provide intelligent cache management and use of network resources without the need for input from a back-end server. Accordingly, these algorithms cannot provide the fine tuning that is possible with interaction from a back-end server, but do provide some acceleration on any web site, even if that site does not have a back-end server.

4.1 Automatic Expiration Control

4.1.1 Overview

Whenever the server is asked to retrieve content from the web, the server places the content in local storage while returning the content to the requestor (either the browser, a subscription, or the server itself). The server then satisfies subsequent requests for the same content from the local storage rather than going to the network. This strategy improves performance but is achieved at a cost. If the content changes at its origin, the caching server will deliver an old copy of the data from local storage, rather than the new copy from the net.

The caching server solves this problem by assigning each piece of content an expiration date. The server satisfies requests for cached content from local storage until the expiration date is reached, after which time it checks at the origin site to see if the content has changed. The origin site may tell the server what the expiration date is, based on knowledge of the content (see Section 3.3, Custom Expiration Control). There may be sites, however, that do not know their content's expiration behavior. In these cases the caching server is forced to invent an expiration date. The quality of the algorithm used to invent the expiration date is extremely important. If it is too liberal, the caching server will serve out-dated content from the cache. If it's too conservative, the server must access the Web frequently, thus reducing performance.

4.1.2 Algorithm Pseudo-Code

Following is a pseudo-code description of the expiration date computation algorithm according to one embodiment, followed by detailed explanations of the algorithm components.

```
if(documentChanged && accessedMoreRecentlyThanModified) then
    AddNewLifetimeSample
endif
if(document has no modification data) then
    expiration = now + fixed amount
else if(document has not changed) then
    if(document has lifetime samples) then
        expiration = now + one sample variance
    else
        expiration = now + ((now − last modification date) / 2)
    endif
else if(document has changed) then
    if(document has lifetime samples) then
        expiration = last modification date + mean lifetime −
one sample variance
        if(expiration is in the past) then
            expiration = now + 1 sample variance
        endif
    else
        expiration = now + ((now − last modification date) / 2)
    endif
endif
```

4.1.3 Lifetime Samples

The algorithm used by the server attempts to "learn" the expiration behavior of each piece of content by tracking its modification history. Every time the content is accessed from the network, its last-modification date is recorded. If that last-modification date changes and is accessed subsequently to that change, then the object has not changed since the current last-modification date and the access time. That time interval can thus be treated as a sample of how often the object changes, i.e. its lifetime.

Each sample is plugged into an estimator algorithm that tracks two quantities: the mean lifetime estimate M and the variance in lifetime samples V. As each new sample is added, the mean and variance change. The variance is weighted more heavily toward recent behavior. The estimator algorithm used is identical to that used in the TCP/IP transport protocol for network round-trip estimation, and is also known as "Jacobsen-Karel Estimator". The known estimator algorithm is utilized in a novel manner as described below.

4.1.4 Case 1: lifetime samples exist

As long as the server owning the content supplies last-modification dates with its content, this scheme works fairly well. The server accumulates a history of samples for each piece of content and stores them permanently. Whenever an object expires, i.e. it is requested and the caching server sees that the content's expiration date is in the past, the caching server goes to the network and asks the content owner for a new copy of the object. The caching server then uses its samples in one of two ways to create a new expiration for the content. Which method it uses depends on whether the content has actually changed or not.

If the content has not changed, then the previous expiration date was too conservative, i.e. too short. Another sample cannot be accumulated because the object has not changed. Instead, the server finds itself in a "grey zone" where its data indicates the object should expire, but the owning server indicates that the object has not expired. In this situation, the server simply adds a single variance V from the content's estimator to the current time and uses that as the new expiration date. This value allows the server to provide some performance benefit (by continuing to cache the object). The variance makes a good "fudge factor" (so called because the server is operating with insufficient data and must guess at a reasonable new expiration date) because it measures the difference between the accumulated samples and their mean. The variance therefore provides at least some approximation to a valid sample, even if it is statistically less likely than the mean.

If the content has indeed changed, then the server adds to the content's most recent last-modified date the current value M from the estimator algorithm. In order to lessen the likelihood that the server will expire the content too late, it then subtracts from the result the current variance value V. The single variance V is chosen for the same reasons as in the previous paragraph. If V is sufficiently large that the last-modified date plus M minus V is before the current time, i.e. the object will already have expired, then technically the object is in a "grey zone" where it could expire at any moment. Given that the caching server wants to provide some performance benefit even under these circumstances, it creates an expiration date that is as small as possible while still allowing the object to be cached. Again, the server chooses a single variance V, for the same reasons as described above.

4.1.5 Case 2: No sample data

If the caching server has no samples, it still attempts to provide a rational expiration date, but it must do so with less data to go on. Again, there are two algorithms used: one if the content actually changed, and one if the content did not change and the previous expiration date was too conservative.

If the content has not changed, the caching server constructs a new expiration date which is the current time plus the difference between the current time and the time the content was last modified. Although this value is not as good as one derived from watching the object's modification history, it works reasonably well. The object is not modified in the interval between its last-modification date and the current time. It is thus predicted to not be modified for the same amount of time into the future, although with little certainty. That lack of certainty is reflected in taking half of the interval rather than a full interval. Again, the idea is for the algorithm to balance accuracy (always handing back the most recent content) with performance (always satisfying requests from the cache).

If the content has changed, the frequency with which the object changes (one interval between now and the time last modified) is likely to be an inaccurate estimate. The object is ideally served out of the cache to maintain performance, but must also be accurate. The algorithm in both situations works in exactly the same manner.

4.1.6 Case 3: No data at all

If the originating server is unfriendly, and provides no modification data, there is even less data for the caching server to go on. It must thus make an expiration estimate that is essentially a wild guess. What it does in this situation is add a configurable amount of time to the current date. The time is based on site meta-data if provided, or a constant of the implementor's choosing.

4.2 Cache Compaction

4.2.1 Overview

As the server's cache fills with content, eventually the cache becomes large enough that its use of resources begins to affect the client machine's performance. To forestall this situation, the caching server automatically compacts its cache periodically. The cache size starts at a standard value (measured in megabytes of content), which can be changed by the end user. Whenever the cache size exceeds its ceiling, compaction occurs.

The most important part of the compaction process is deciding which pieces of content to remove from the cache and which to keep. If the algorithm is not discriminating enough, then content which the user accesses frequently is just as likely to be removed as content which the user has rarely seen. Lookahead complicates the situation, since by definition it is predictive and if it fails to predict correctly, content will be cached that the user never accesses. Size of the content also complicates things, since large content is more expensive to fetch than small content.

The compaction algorithm described below takes into account a number of factors which together decide accurately which content to keep and which to throw out.

4.2.2 Compaction Algorithm

Compaction is an expensive operation relative to other operations performed by the caching server. In order to keep compaction from occurring too often, the algorithm does not simply remove content until the cache size returns to its allowable maximum. Instead, the algorithm compacts the cache to 75% of its former size, allowing some head room for the cache to grow before compaction again occurs. 75% is a reasonable compromise between frequency of compaction (if the percentage were higher) and lack of desired content and corresponding lower performance (lower percentages).

According to one embodiment, the compaction algorithm measures the following properties of each piece of content:
 when it was last accessed
 how much network resource is required to retrieve the content
 how often it is accessed These three properties are normalized into a score using the algorithm described below. All content is then ordered by score, at which point compaction becomes a simple process of removing the worst-scoring content until the overall cache size drops below the ceiling. The algorithm places paramount importance on the time a piece of content was last accessed. If the content has never been accessed, then the importance is given to the time it arrived in the cache. Content that is old needs to be removed quickly. Second in importance is frequency of access. Even old content should remain in the cache if it is accessed often enough. Size is least important, unless the content is truly huge, in which case the algorithm can keep significantly more pieces of content in the cache by deleting a single large object, and should probably do so. The scoring algorithm normalizes these three components (size, last-access, and frequency of access) into a single value, where high scores indicate a more suitable candidate for removal, and low scores a more suitable candidate for retention.

4.2.2.1 Last-Access Component

The last-access part of the score is highly non-linear approximated with piece-wise linear approximation. Content is assumed to be most useful in the first eight hours after it is accessed. It then ratchets down in usefulness if between eight hours and four days has elapsed since the content has been last accessed. According to one embodiment, once a piece of content has not been accessed in more than four days, it is deemed useless unless accessed often prior to that most recent access. If a piece of content is never accessed, the algorithm assigns an initial last access time equal to the time the content arrived in the cache. That is, all pieces of content are "accessed" at least once, with that time equal to the arrival time.

The algorithm assigns one point to the last-access component for each minute since the content has been accessed, up to a maximum of eight hours worth, or 480 points:

$$480=8*60$$

For each minute over eight hours but below four days since the content has been accessed, the algorithm assigns half a point to the last-access component, up to a maximum of 3120 points:

$$3120=480+(((96 \text{ hours}-8 \text{ hours})*60 \text{ minutes})/2)$$

Finally, for each minute over four days since the content has been accessed, the algorithm assigns four points to the last-access component. The dramatic increase in the slope of the function represents our belief that content not accessed in the past four days old is very unlikely to be used again unless it has been accessed often before that. The increased slope is designed to be large enough that content accessed once or twice will get a high score and be removed, but small enough so that content accessed 10–20 times will reduce the score to the point that the object might not be removed. There is no maximum on the number of points assigned in this manner. For example, at a approximately a month after most recent access, the score is:

$$480 +$$
$$(((96 \text{ hours} - 8 \text{ hours}) * 60 \text{ minutes}) / 2) +$$
$$(28 \text{ days} - 4 \text{ days}) * 24 \text{ hours} * 60 \text{ minutes} * 4 =$$
$$141360$$

4.2.2.2 Size component p The algorithm is non-linearly biased against "large" content. The algorithm divides all content up into three zones based on size. The zone boundaries are based on the distribution of content sizes in the internet. Zone 1 content is typically HTML, and must be less than 16 kilobytes in size. Zone 2 content is typically inline images and ranges in size from 16 to 40 kilobytes. Zone 3 content is typically large images, audio files, and full-motion video, and is larger than 40 kilobytes.

To approximate the desired non-linear behavior, the algorithm starts with a "score" equal to the content's size. If the content is in zone 2 or 3, the score is increased by the amount that the content exceeds 16 KB. If the content is in zone 3, the score is further increased by the amount that the content exceeds 40 KB. The algorithm considers high scores as more likely for compaction than low scores. As an example, a piece of content 12 KB in size gets a score of 12. A piece of content that is 31 KB in size gets a score of 31+15=46. Finally, a piece of content that is 122 KB in size gets a score of 122+106+82=310. The reason the algorithm gives a disproportionately large score to large content is that it can keep far more content in the cache by deleting a single large piece of content than a number of smaller pieces of content. By increasing the score related to size non-linearly, the algorithm is far more likely to remove big content than smaller content.

The formula for size-related scoring is thus:

$$S=\text{size}+\max(0, \text{size}-16 \text{ K})+\max(0, \text{size}-40 \text{ K})$$

4.2.2.3 Frequency Component

The frequency component is also non-linear. The reason for the non-linearity is that there is a large class of content which is accessed either never or only once. Content that is never accessed could, for example, have been looked ahead on by the caching server but never actually seen by the user. Other content never accessed could include headlines loaded by the caching server on behalf of a channel, but never read by the user.

Content accessed zero times or one time may be maintained in the cache for an eight hour period and then disposed of as quickly as possible. Content accessed more than once, however, increases dramatically in importance, because it probably is not a headline that was read once and discarded, but rather a more useful piece of content.

The algorithm uses a step function to reflect this property of incoming content. Content accessed zero times is assigned a frequency component term of 1. Content accessed once is given a value of 2. Content accessed more than once is given a value of the number of accesses plus 3. The function is therefore linear with a "jump" at two accesses.

4.2.2.4 Complete Algorithm Formula

According to one embodiment, the complete scoring algorithm formula for the compaction score C is:

$$C=(S+L)/F$$

Where S is the size term, L is the last-access term, and F is the frequency term.

High scores describe content that should be removed, and low scores describe content that should be kept. A high score therefore arises either from a combination of a low number of accesses, a last-access time far in the past, and a large size.

The algorithm has the following desirable properties:

the value of L is large compared to that of S as time increases; that means the more time that has elapsed since the content has been accessed, the less important the content's size is. S is most able to affect the score in the first eight hours since content has been accessed, where the value of L is fairly small.

The larger F, the smaller the score. Most content deserving of removal is accessed once (F=2) or not at all (F=1), making the frequency component essentially irrelevant and lending all important to S and L.

As content is accessed more than once, the value of F jumps from 2 to 5 and then linearly after each access. That means even if a 40 K piece of content has gone a week without being accessed, if it was accessed 50 times before that, its score:

(64+20400)/53=386

Is approximately the same as that of the same piece of content accessed only once in the past eight hours.

(64+480)/2=272

This property is particularly useful for boilerplate graphics that are not accessed for a while. Such graphics can be expensive to download, and the algorithm should try keep them in the cache if they are shared by many web pages.

4.3 Bandwidth Management 4.3.1 Overview

Figure 8:
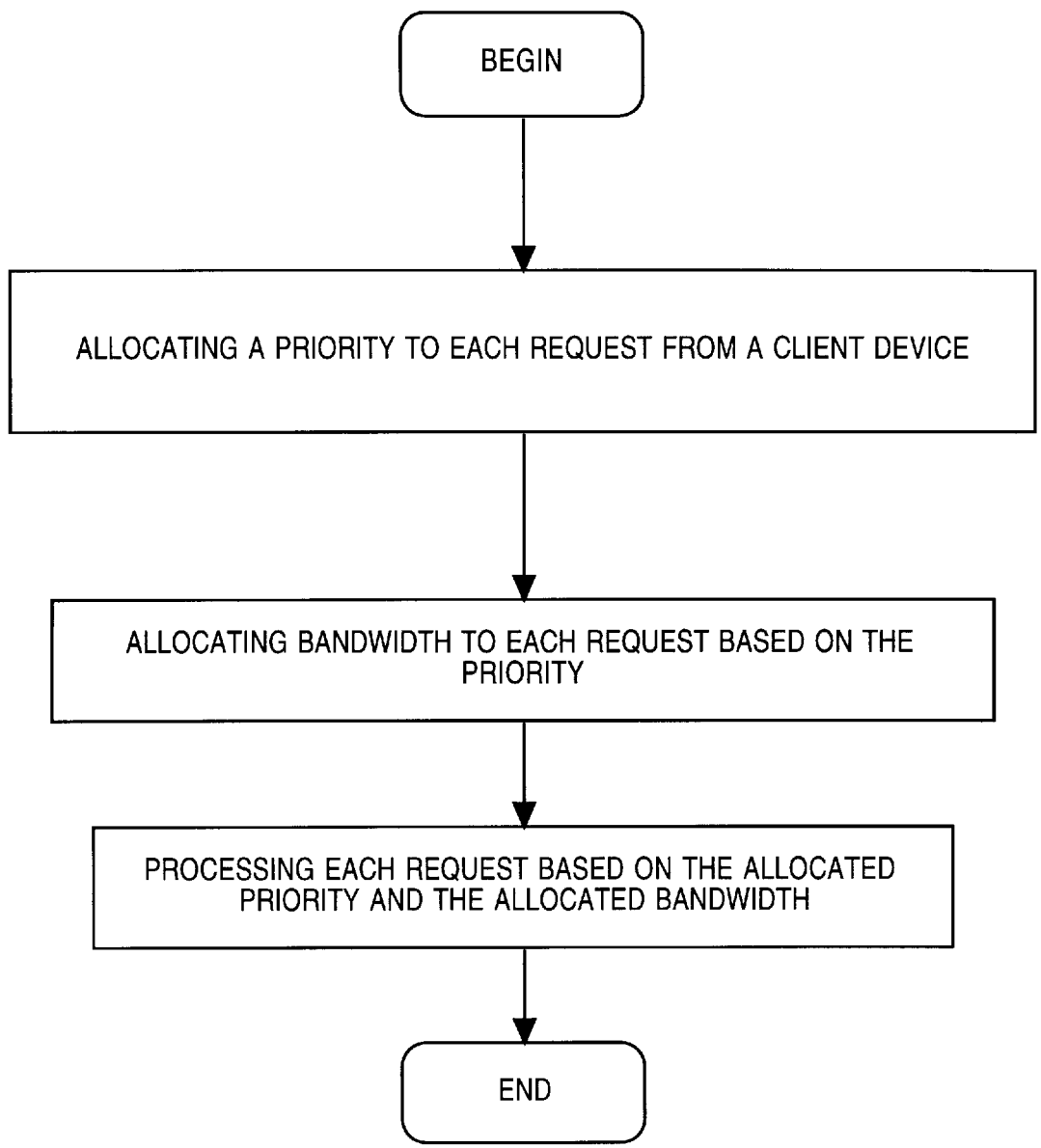
FIG. 8 is a flow chart illustrating one embodiment of the present invention.

The caching server is responsible for making sure the user's browsing experience is as good as possible. While lookahead improves the user experience in the long run, in the short run lookahead can detract from the user's experience if background lookahead processing is taking up network bandwidth while the user is performing foreground browsing operations. The caching server has several mechanisms to manage bandwidth and optimize use of the network. FIG. 8 is a flow chart illustrating an overview of one embodiment of bandwidth management.

4.3.2 Bandwidth sharing

According to one embodiment of the present invention, every task performed by the caching server runs at a particular priority. Request tasks are responsible for taking a request made internally by the caching server or by the browser and satisfying it, either from the cache or from the network. If the request is satisfied through the network, it must share bandwidth with other requests in a manner consistent with its priority. Browser requests, for example, must get more of the available bandwidth than lookahead requests.

According to one embodiment, a standard sockets interface is used in a special algorithm that implicitly manages bandwidth according to request priority. Each TCP connection managed by Windows Sockets has a "window" which represents the amount of data on that connection that can be in transit before transmission stops and awaits acknowledgment from the destination endpoint. The larger the window, the more data can be in transit. Incoming TCP data is buffered for delivery to the application, which reads the data, causing it to be acknowledged to the sender, which in turn opens the transmission window for more data.

By not reading a TCP connection, an application can prevent data from being acknowledged and therefore more data from being transmitted. By selectively reading and not reading different TCP connections, the caching server can control the amount of network bandwidth taken by each connection. The only problem with this solution is the lag between the time the caching server stops reading a connection and the time the sender's window is exhausted. A large window can keep sufficiently large amounts of data "in the pipe" that ceasing to read a connection does not immediately lower that connection's share of the bandwidth.

To solve this problem, each TCP connection's transmission window is adjusted according to request priority. High-priority requests get the largest window recommended (typically 8192 bytes), and low-priority requests get a small window, typically one or two network Maximum Transmission Units (MTU). When a low-priority request is running, it will run more slowly, and with less data outstanding, than a high-priority request. As soon as a high-priority request enters the system, data from all lower-priority requests are ignored. Since low-priority requests have small TCP windows, amount of data still in the pipe from those connections is quite small (and completely controlled by setting the low-priority request window size), and ceasing to read the connections causes an immediate drop in the bandwidth consumed by them, bandwidth which can then be taken by the high-priority connections.

As soon as there are no more high-priority requests, the caching server once again begins reading from lower-priority request connections, opening up their windows. The server does not begin doing so immediately. Instead, it assumes that one high-priority request will generate other high-priority requests (as an HTML page request by a browser will lead to requests for that page's in-line images, for example). Every time high-priority traffic travels through the server, the server advances a timer. The duration of the timer is a measure of how long the server is willing to wait before it decides there are no immediately following high priority requests. Only when the timer expires does the server begin reading from lower-priority connections.

There are a number of variations on this algorithm that the server can employ as needed. As it measures the number and frequency of high-priority connections, it can further improve the performance of low-priority connections by opening their windows. When the server believes enough time has passed that the presence of a high-priority request is increasingly likely, it can begin shrinking the size of low-priority request windows, so that when a high-priority request finally does arrive, the low priority requests have small windows and therefore small amounts of data in the pipe and minimal impact on available bandwidth.

Thus, a method and apparatus for storage and delivery of documents on the Internet is disclosed. The specific arrangements and methods described herein, are merely illustrative of the principles of the present invention. Numerous modifications in form and detail may be made by those of ordinary skill in the art without departing from the scope of the invention. Although this invention has been shown in relation to a particular preferred embodiment, it should not be considered so limited. Rather, the present invention is limited only by the scope of the appended claims.

We claim:

1. A method for managing bandwidth between a client device and a network, said method comprising the steps of:

allocating a priority to each request from said client device;

allocating bandwidth to a low-priority request to be processed;

processing said low-priority request based on said allocated bandwidth until a high-priority request demands to be processed; and resuming processing said low-priority request after a predetermined amount of time following completion of processing said high-priority request, said predetermined amount of time being calculated to predict that said high priority request did not generate other high priority requests.

2. The method of claim 1 wherein the step of processing low-priority request comprises the steps of:

ceasing to process all running low-priority requests upon receiving a high-priority request;

allocating bandwidth to said high-priority request; and processing said high-priority request based on said allocated bandwidth.

3. The method of claim 1 wherein the step of resuming processing said low-priority request is performed if no high-priority requests are running.

4. The method of claim 1 wherein a request for displaying data to a user is allocated a high priority.

5. The method of claim 1 wherein a request for preloading predicted data from a network server to a cache on said client device is allocated a low priority.

* * * * *